(12) United States Patent
Herniter et al.

(10) Patent No.: US 6,255,804 B1
(45) Date of Patent: *Jul. 3, 2001

(54) METHOD FOR CHARGING A BATTERY WITH MAXIMUM POWER TRACKING

(75) Inventors: Marc E. Herniter; William J. Schlanger, both of Flagstaff, AZ (US)

(73) Assignee: Fire Wind & Rain Technologies LLC, Flagstaff, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/535,362

(22) Filed: Mar. 24, 2000

Related U.S. Application Data

(63) Continuation of application No. 09/156,228, filed on Sep. 18, 1998, now Pat. No. 6,057,665.

(51) Int. Cl.[7] .................................................. H01M 10/44
(52) U.S. Cl. ............................................ 320/137; 320/163
(58) Field of Search ................................ 320/101, 123, 320/137, 139, 140, 143, 163, DIG. 28, DIG. 29; 323/299, 303, 906; 136/290, 291, 293

(56) References Cited

U.S. PATENT DOCUMENTS

| | | | |
|---|---|---|---|
| 3,350,635 | 10/1967 | Mesch | 324/29.5 |
| 3,384,806 | 5/1968 | Hartman | 322/2 |
| 3,696,286 | 10/1972 | Ule | 323/15 |
| 3,825,816 | 7/1974 | Togneri et al. | 321/18 |
| 4,200,833 | 4/1980 | Wilkerson | 323/20 |
| 4,375,662 | 3/1983 | Baker | 363/95 |
| 4,390,940 | 6/1983 | Corbefin et al. | 363/132 |
| 4,404,472 | 9/1983 | Steigerwald | 307/46 |
| 4,604,567 | 8/1986 | Chetty | 323/299 |
| 4,679,130 | 7/1987 | Moscovici | 363/17 |
| 4,692,855 | 9/1987 | Kuroiwa et al. | 363/95 |
| 4,873,480 | 10/1989 | Lafferty | 323/229 |
| 4,924,323 | 5/1990 | Inaba et al. | 363/95 |
| 5,027,051 | 6/1991 | Lafferty | 323/222 |
| 5,077,652 | 12/1991 | Faley | 363/97 |
| 5,105,352 | 4/1992 | Iwasa et al. | 363/98 |
| 5,120,986 | 6/1992 | Shekhawat | 307/261 |
| 5,166,870 | 11/1992 | Shimizu et al. | 363/41 |
| 5,229,929 | 7/1993 | Shimizu et al. | 363/98 |
| 5,270,636 | 12/1993 | Lafferty | 320/61 |
| 5,309,345 | 5/1994 | Nakamura et al. | 363/41 |
| 5,327,071 | 7/1994 | Frederick et al. | 323/299 |
| 5,381,328 | 1/1995 | Umezawa et al. | 363/41 |
| 5,400,237 | 3/1995 | Flanagan et al. | 363/41 |
| 5,442,538 | 8/1995 | Ikeda et al. | 363/95 |
| 5,563,776 | 10/1996 | Eck | 363/26 |
| 5,654,883 | 8/1997 | Takehara et al. | 363/79 |
| 5,668,713 | 9/1997 | Eguchi et al. | 363/95 |
| 5,680,302 | 10/1997 | Iwata et al. | 363/132 |

Primary Examiner—Edward H. Tso
(74) Attorney, Agent, or Firm—Cahill, Sutton & Thomas P.L.C.

(57) ABSTRACT

Apparatus and attendant methodology for extracting maximum power from an energy source, such as a photo voltaic panel, an array of photo voltaic panels, or a windmill and delivering that power to a battery or an array of batteries is disclosed. The apparatus determines the maximum operating point of the energy source, and circuits and circuit topologists are presented for extracting the energy. The apparatus eliminates the problem of finding local maximum points, and problems attendant variations of the absolute maximum power point as a function of temperature, insolation, array construction, and photo voltaic panel manufacturing tolerances. The energy source supplies power in the form of a voltage and charges the batteries with a controllable current source.

37 Claims, 17 Drawing Sheets

MINI-SWEEP ALGORITHM

FLOW CHART OF POWER MAXIMIZATION ALGORITHM

MINI-SWEEP ALGORITHM

COMPLETE I-V CHARACTERIZATION ALGORITHM

METHOD FOR CHARGING A BATTERY WITH MAXIMUM POWER TRACKING

This is a continuation of application Ser. No. 09/156,228, filed Sep. 18, 1998 now U.S. Pat. No. 6,057,665, entitled "BATTERY CHARGER WITH MAXIMUM POWER TRACKING", which application is assigned to the present Assignee and describes the invention by the present inventors.

BACKGROUND OF THE INVENTION

1. Field of the Invention

The present invention relates to chargers for batteries and, more particularly, to extracting the maximum power available from a variable energy source to charge the batteries.

2. Description of Related Art

The present invention is directed to apparatus and a method for obtaining maximum power from an energy source, such as a photo voltaic panel, an array of photo voltaic panels, or a windmill. Although the invention is directed to only these two energy sources, the apparatus and methodology presented could be used in conjunction with any constant or variable output electrical energy source. To obtain the maximum power from an energy source requires two items. First, a methodology is required to determine the operating voltage and current that yields the maximum power that can be extracted from the energy source. Second, a circuit is required to extract the energy at the specified voltage and current. The circuit must be capable of accepting a wide range of voltage inputs and a wide range of current inputs. The circuit must also be able to maintain the input voltage and current at the values determined by the methodology to yield maximum energy extraction from the energy source.

Several methodologies and attendant circuitry have been used in the prior art for extracting maximum power from photo voltaic panels. The algorithms seek a voltage and current from the panels that result in maximum power being extracted from the panels These methodologies are summarized below with reference to illustrative U.S. patents:

a) Differentiation—U.S. Pat. No. 3,384,806 discloses use of the derivative of the output power versus time. A small sinusoidal signal is added to the control voltage of a pulse width modulation (PWM) controlled buck regulator and the time derivative of the output power is observed. Depending on the value of the derivative, a correction to the PWM control signal is obtained to yield maximum power extraction. A problem with this methodology is that it does not observe the entire current-voltage (I–V) characteristic of a photo voltaic panel and can lock on to a point that is a local maximum rather than an absolute maximum.

b) Open Circuit Voltage—In U.S. Pat. No. 4,873,480 and U.S. Pat. No. 4,604,567, the open circuit voltage of a photo voltaic panel or an array of panels is treated as directly being proportional to the voltage of the panels where maximum power can be extracted. The signal obtained from the open circuit voltage can then control a circuit that uses the signal to determine how much power to extract from the photo voltaic panels. The problem with this methodology is that the selection of the maximum power point does not consider the power extracted from the panels. It assumes that a given open circuit voltage accurately determines the operating point for maximum power extraction. If the operating point is incorrect or slightly inaccurate, operation at the maximum power point will not occur since the power extracted is not actually measured.

c) Tracking Cell—Many methodologies use a separate tracking cell to measure the amount of insolation incident on a photo voltaic array; note U.S. Pat. Nos. 4,873,480 and 3,696,286. The tracking cell yields information that could be used to select the maximum power point; that is, the open circuit voltage of a tracking cell is used. This methodology assumes that the cell has identical properties to each cell in a photo voltaic array; the open circuit voltage of the cell is treated as proportional to the open circuit voltage of the photo voltaic array. The open circuit voltage can then be used to select the maximum power point. If the assumption made is not correct, maximum power will not be drawn out.

d) Dithering—U.S. Pat. No. 5,327,071 discloses a switching circuit that controls the power extracted from a solar panel. Typically, the power is controlled by pulse width modulation (PWM) and a control input is available for controlling the power drawn from the energy source. The dithering methodology works as follows. The present operating power is recorded. The control signal is then increased or decreased (dithered) by a certain amount. The power at the new point is observed. By comparing the power at the original operating point to the power at the dithered points, a new maximum energy extraction operating point can be found, or the present operating point can be retained. A problem with this methodology is that it does not observe the entire I–V characteristic of a photo voltaic panel(s) and can lock on to a point that is a local maximum rather than an absolute maximum. U.S. Pat. No. 5,654,883 discloses use of a dithering method that examines m points above and below a present operating point. The power at each point is compared and a new maximum power operating point is selected. By examining m points, this method helps reduce the problem of finding a local maximum rather than an absolute maximum. However, it cannot eliminate the problem since it only examines m points rather than the entire I–V characteristic.

SUMMARY OF THE INVENTION

The present invention is directed to apparatus for extracting maximum power from a variable voltage energy source, such as a photo voltaic panel or an array of photo voltaic panels, to charge one or more batteries. All of the chargers described will permit charging batteries at a higher voltage than the voltage of the energy source.

A primary object of the present invention is to allow the photo voltaic panels to operate at any voltage independent of the battery voltage and still obtain a charging current.

Another object of the present invention is to charge a battery from an energy source while extracting maximum power from the energy source that may be at a higher or at a lower voltage than the battery.

Yet another object of the present invention is to charge batteries with smaller photo voltaic arrays than is presently possible.

Still another object of the present invention is to reduce the parts count of a battery charger deriving power from a photo voltaic array.

These and other objects of the present invention will become apparent to those skilled in the art as the description thereof proceeds.

BRIEF DESCRIPTION OF THE DRAWINGS

The present invention will be described with specificity and clarity with reference to the following drawings, in which.

DESCRIPTION OF THE PREFERRED EMBODIMENT

Figure 1:
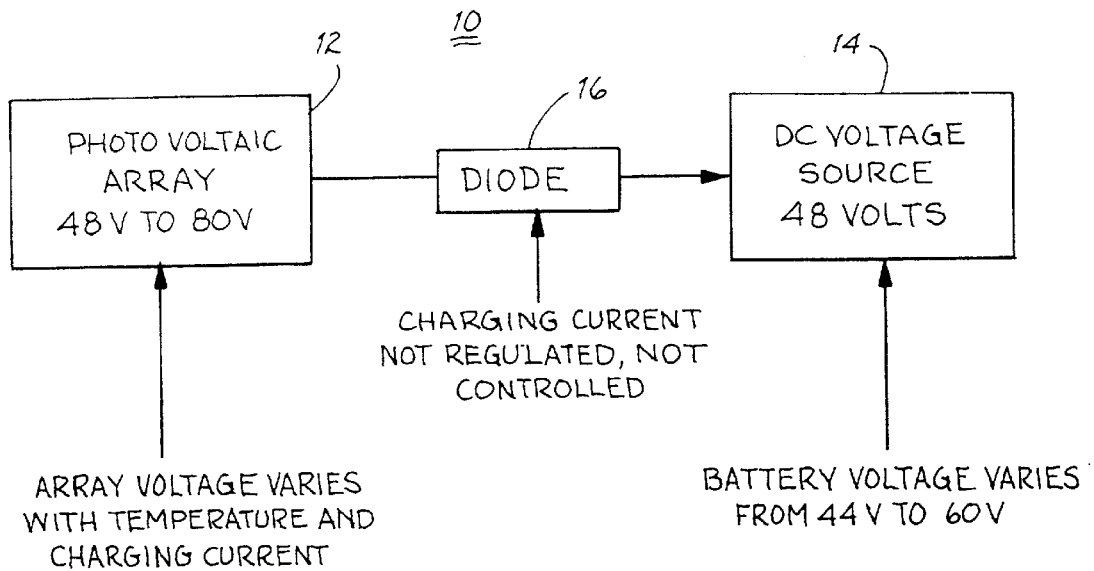
FIG. 1 illustrates a block diagram of a prior art charger.

A basic prior art charger 10 for photo voltaic systems is shown in FIG. 1. A photo voltaic array of panels 12 provides a DC voltage which is the energy source for the charger. A typical 48 V system (a system that uses combination of batteries configured for a nominal voltage of 48 V) would use four 12 V photo voltaic panels giving a typical voltage between 48 and 80V. For a 48 volt system, batteries 14 will typically have voltages in the range of 44 to 60 V DC. When the voltage provided by the photo voltaic panel is greater than the battery voltage, diode 16 will turn on and the photo voltaic panel will charge the battery. If the voltage of the photo voltaic panel is less than the battery voltage, the diode will be off and no current will flow. This charger has the following problems: 1) When the battery is charging, the charging current is not regulated and not controlled; 2) No charging is possible if the photo voltaic panel voltage is lower than the battery voltage. This results is lost energy; 3) There is no way to vary the charging current to extract the maximum amount of power from the photo voltaic panel; 4) The voltage of the photo voltaic panel varies with temperature. As temperature increases, the photo voltaic panel voltage decreases. Locations with large amounts of insolation (energy flux from the sun) usually have high ambient temperatures. If temperatures are high enough, even with large amounts of insolation, no charging will be possible because the photo voltaic panel voltage is less than the battery voltage; and 5) The voltage of the photo voltaic panel decreases as the current drawn from it increases. With the photo voltaic panel output hooked up as an open circuit, there will be no current drawn from the panel and the voltage will be at its maximum. Since the current is zero, no power is drawn from the panel. With the photo voltaic panel output shorted, the current will be at its maximum but the output voltage will be close to zero. This situation also corresponds to close to zero output power. When the voltage is somewhere between 0 and its maximum value, and when the current is somewhere between 0 and its maximum value, the power drawn from the photo voltaic panel is maximum. This maximum point varies with ambient temperature, insolation, manufacturing tolerances, and age. The diode charging method does nothing to extract the maximum power from the photo voltaic panel.

Figure 2:
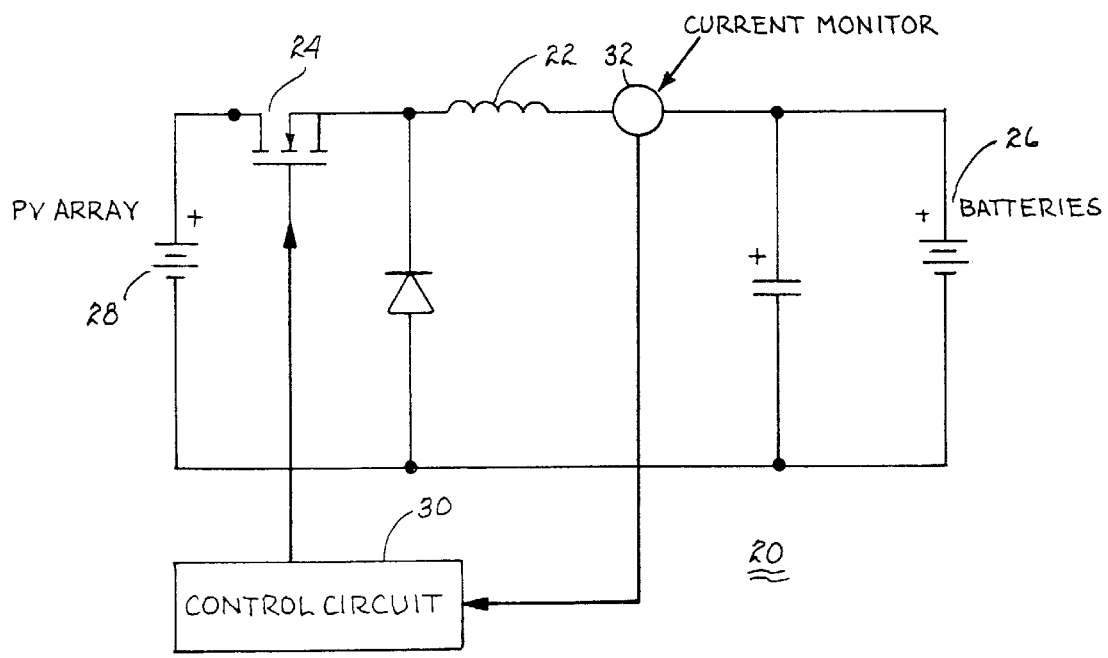
FIG. 2 illustrates a circuit for a prior art charger, such as that shown in FIG. 1.

The circuit for a second common prior art charger 20 for charging is shown in FIG. 2. This circuit is a switching regulator that uses a "buck" configuration. Examples of this prior art are shown and described in U.S. Pat. Nos. 4,873,480, 3,384,806, and 5,327,071 discussed above. There are several variations of this circuit. When used without inductor 22, charger 20 becomes an on/off charger. When MOSFET 24 is on, batteries 26 are charged from photo voltaic array 28. The MOSFET can also be controlled by a pulse width modulation (PWM) signal generated by control circuit 30 as a function of current monitor 32 to vary the charging current when the batteries are nearing a fully charged state. The MOSFET is turned off when no charging current is required.

When the inductor is included in the circuit shown in FIG. 2, the circuit becomes a conventional "buck" switching circuit topology. With this type of circuit, the input power is equal to the power out, less any losses of the circuit. This type of circuit can be configured to (a) control the charging current, (b) turn off the charging current when necessary, and (c) incorporate maximum power tracking to extract the maximum charging energy from the photo voltaic array.

Other circuit topologists have been used to extract maximum power from photo voltaic arrays, as described in U.S. Pat. Nos. 5,027,051 and 5,270,636. These topologists are much more complicated than the topologists of the present invention. These prior art circuits use two switching elements and two inductors in each design. The requirement for increased switches and inductors increases system costs and reduces the circuits' efficiency.

For both of the chargers shown in FIGS. 1 and 2, the photo voltaic array must produce a voltage that is higher than the battery voltage in order to charge the batteries at any rate. This requirement imposes the following limitations: 1) The photo voltaic array requires more panels to achieve a voltage that is high enough to charge the batteries. For example, a 48 V system (a system that uses a combination of batteries configured for a nominal voltage of 48 V) would require four 12 V panels wired in a series configuration. A 24 V system (a system that uses a combination of batteries configured for a nominal voltage of 24 V) would require two 12 V panels wired in a series configuration; and, 2) At high ambient temperatures the voltage produced by photo voltaic panels decreases. To extract maximum power from the panels, the charger must find the current and voltage required by the photo voltaic panel that produces maximum power. With the added constraint that the photo voltaic voltage must be greater than the battery voltage, extracting maximum power from the photo voltaic panel may not be possible.

Figure 3:
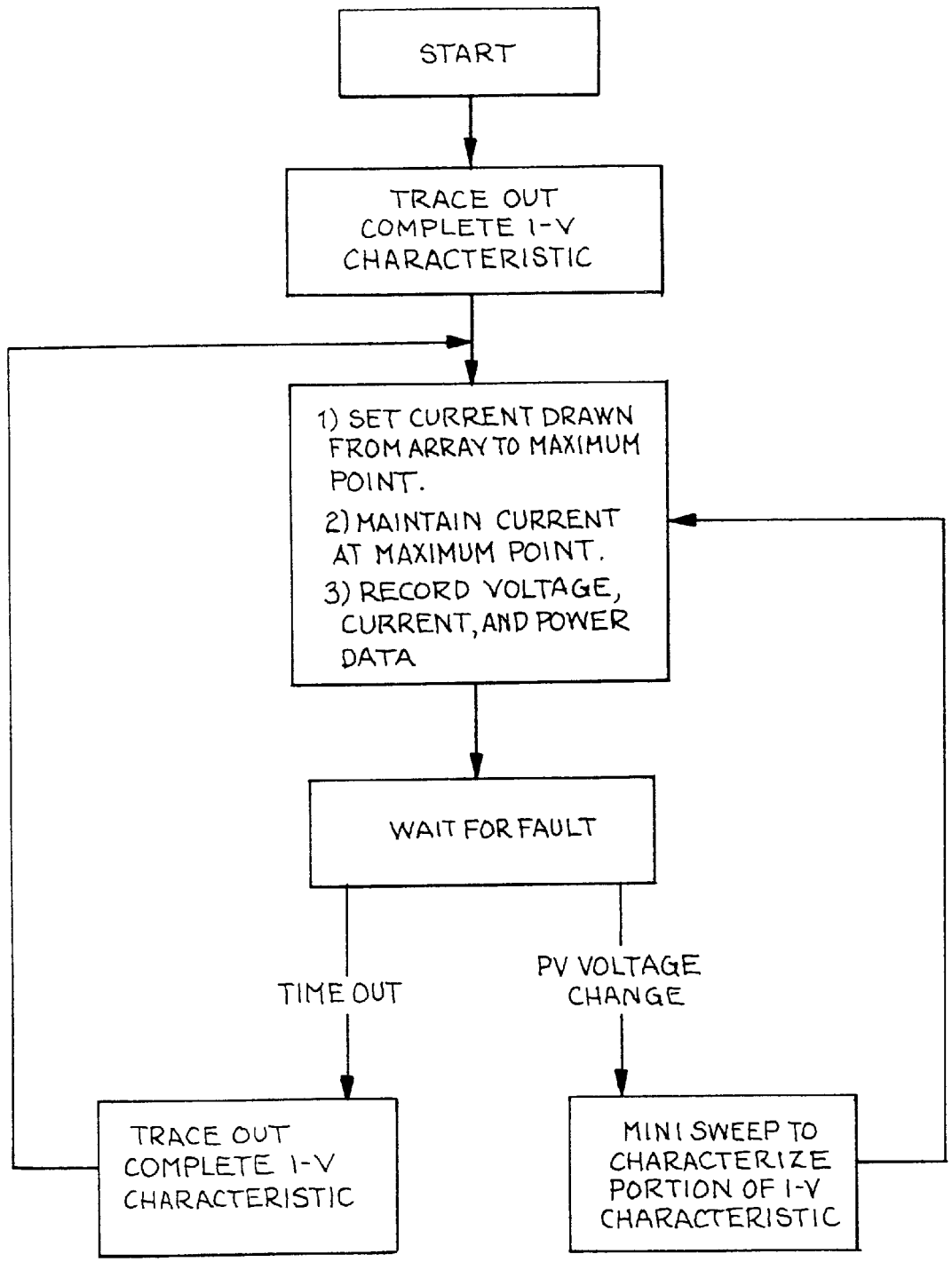
FIG. 3 is a flow chart of a power maximization algorithm.
Figure 5:
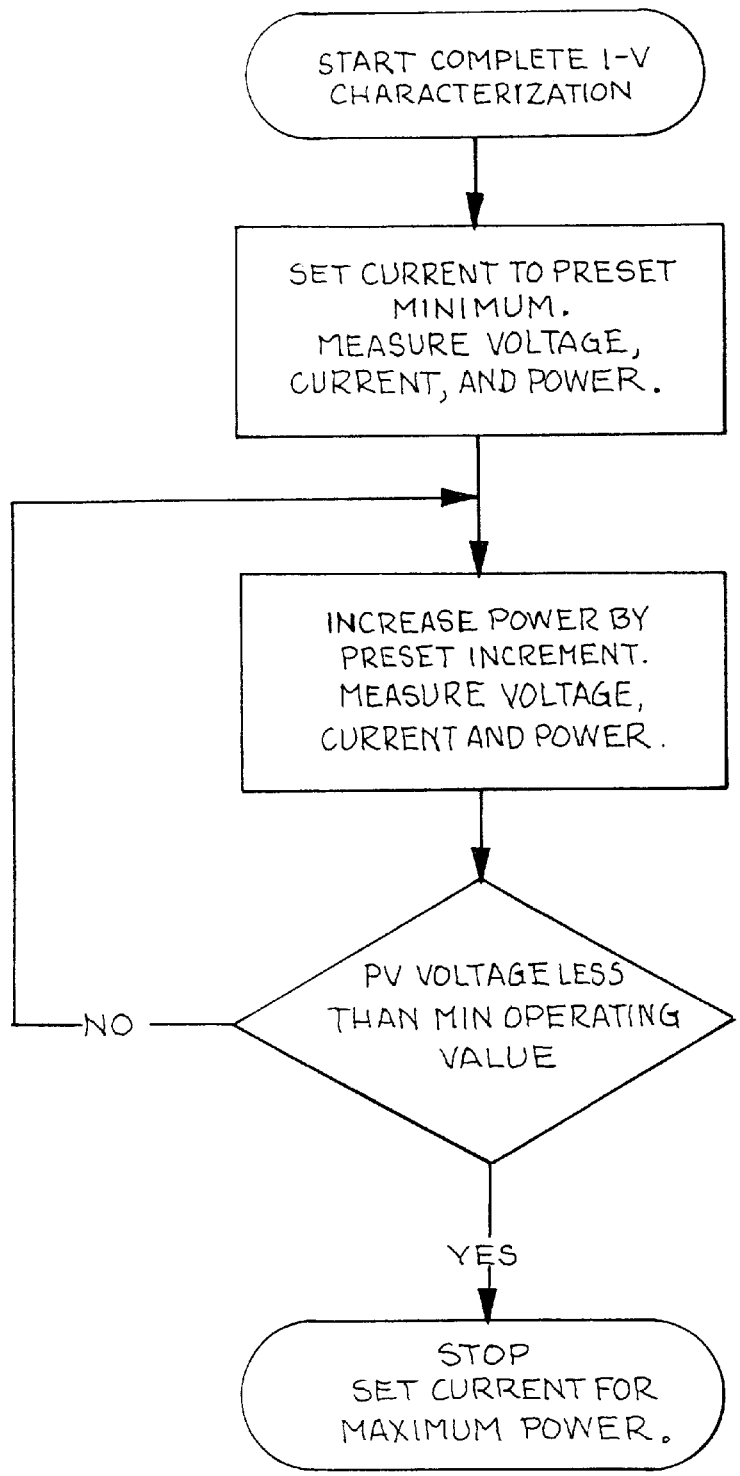
FIG. 5 is a flow chart of an I–V characterization algorithm.

The maximum power tracking algorithms discussed below eliminate problems such as finding local maxima rather than an absolute maximum, how the maximum power point varies with photo voltaic panel age, insolation, panel temperature, photo voltaic array construction, and manufacturing tolerances. A flow chart of the power maximization algorithm is shown in FIG. 3. The algorithm periodically traces out the entire I–V characteristic of the photo voltaic array. From this data the current and voltage that yield maximum power are determined. The charger, or power converter circuit, is instructed to draw the amount of current from the photo voltaic array that yields maximum power. The converter will draw this current until one of the two following conditions occur:

1) The time out interval is reached. If, after a predetermined interval, the voltage of the photo voltaic array has remained constant, a new complete I–V characterization is generated. A flow chart of the I–V characterization is shown in FIG. 5. A new maximum power point is determined and then the power converter circuit is instructed to draw the amount of current from the photo voltaic array that yields maximum power.

Figure 4:
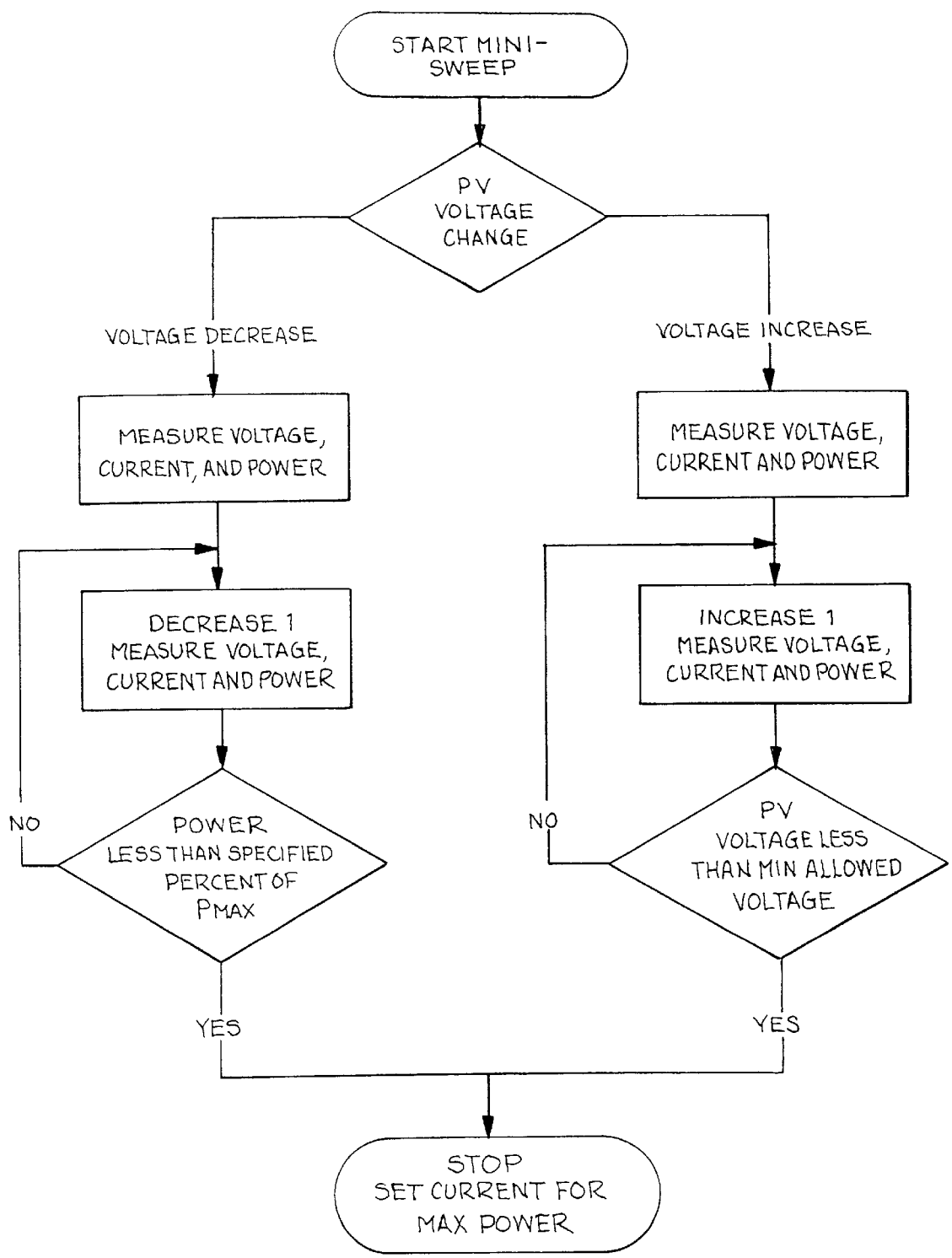
FIG. 4 is a flow chart of a mini-sweep algorithm.

2) The circuit senses a change in photo voltaic array voltage. Changes in voltage trigger mini-sweeps where only a fraction of the I–V characteristic is observed. A flow chart of the mini-sweep function is shown in FIG. 4.

a) If the photo voltaic array voltage increases, it is assumed that more power is available from the array. The sweep starts at the present value of the current and traces out the I–V characteristic for currents greater than or equal to the last operating current. This mini-sweep ends when the photo voltaic array voltage goes below a preset minimum operating voltage.

b) If the photo voltaic array voltage decreases, it is assumed that less power is available from the array. The sweep starts at the present value of the current and traces out the I–V characteristic for currents less than or equal to the last operating current. The sweep is terminated when the power produced by the array falls below a specified percent of the maximum power observed during the sweep.

Figure 6:
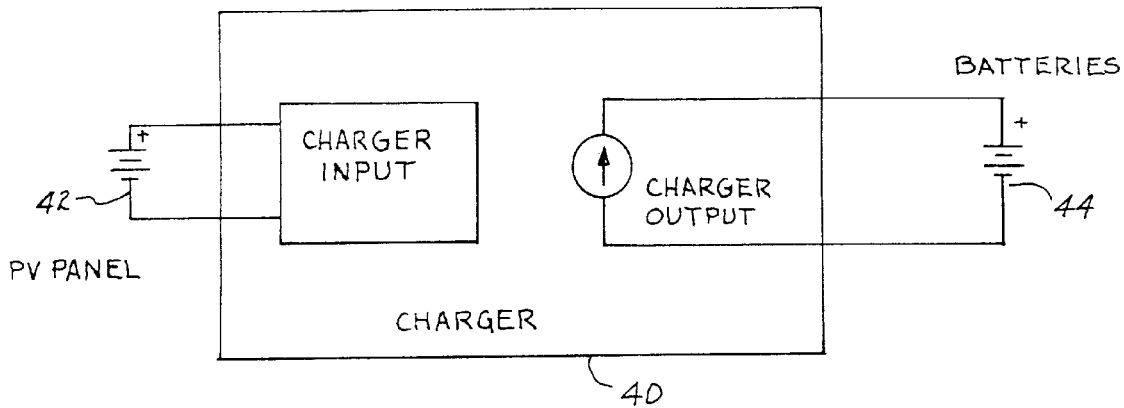
FIG. 6 is a simplified block diagram of the present invention.

The chargers discussed here can all be modeled by the simple diagram shown in FIG. 6. Charger 40 draws power from photo voltaic panel 42. The panel provides power as if it were a voltage source. Power is drawn from the photo voltaic panel in such a manner that the power extracted is the maximum that the panel can provide. The power in the form of a voltage source is converted to power in the form of a current source. The current source charges battery 44. By definition of a current source, the current will be constant, independent of the voltage. Thus, the battery will be charged by a controlled current, independent of its voltage. In a practical circuit, the battery voltage is limited by the devices of a specific product. For this type of system, the charging power to the batteries is equal to the power supplied by the photo voltaic panel minus some losses. Essentially, $P_{in} = P_{out}$.

This methodology solves all of the problems inherent in prior art methods, including: a) Since the batteries are charged with a constant current source, the charging current is regulated; b) Power is drawn from the panel independent of the photo voltaic panel voltage and battery voltage; and c) The charging power is variable and can be chosen to draw maximum power from the photo voltaic panel. The charging power can be varied to draw maximum power independent of the amount of insolation, the temperature, construction tolerances, panel age, and panel array structure.

Figure 7:
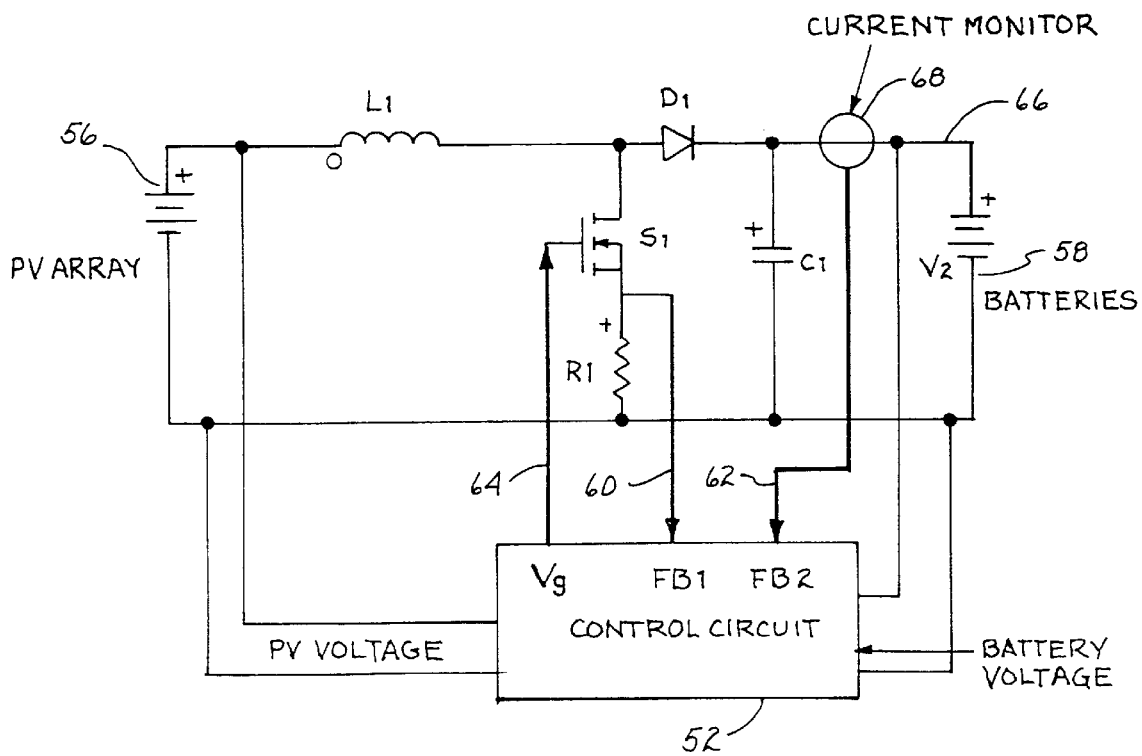
FIG. 7 is a circuit diagram illustrating two feedback signals for controlling the charging current.

The general methods discussed herein use current mode topologies. With these topologies the feedback signals are usually the instantaneous switch current and the output voltage. With a battery charger, the output voltage is fixed at the battery voltage, and thus control of the output voltage is not necessary. The methods discussed here also use two feedback signals. The first feedback signal (FB1) is the instantaneous switch current and is the same for a conventional current mode topology. The second feedback signal (FB2) is an average current, either the average battery current, or average input current (the current provided by a photo voltaic array or windmill). When the feedback is the average battery current, the circuit regulates the charging current. A schematic of such a charger 50 is shown in FIG. 7. The topology is not optimal for extracting maximum power from the energy source. To show that this topology is not optimal, we will use the example of maximum energy extraction from a photo voltaic array. Suppose that we are charging the battery at voltage $V_o$ and current $I_o$. To provide this power, the photo voltaic panel supplies power at voltage $V_i$ and $I_i$. This power level was chosen because it was the maximum power that the panel could supply. Next, suppose that the input voltage decreases by a slight amount, $\Delta V_i$. Even though the input changes, the battery voltage remains fairly constant and the topology keeps the output current constant. Thus, even though the input voltage changed, the topology attempts to keep the output power constant. Since the input voltage decreased and the output power remained the same, the current supplied by the photo voltaic array must increase to keep the input power equal to the output power. A characteristic of photo voltaic panels is that once you find the voltage and current at the point of maximum power, any current above that point of maximum power causes a large decrease in photo voltaic panel voltage.

Figure 8:
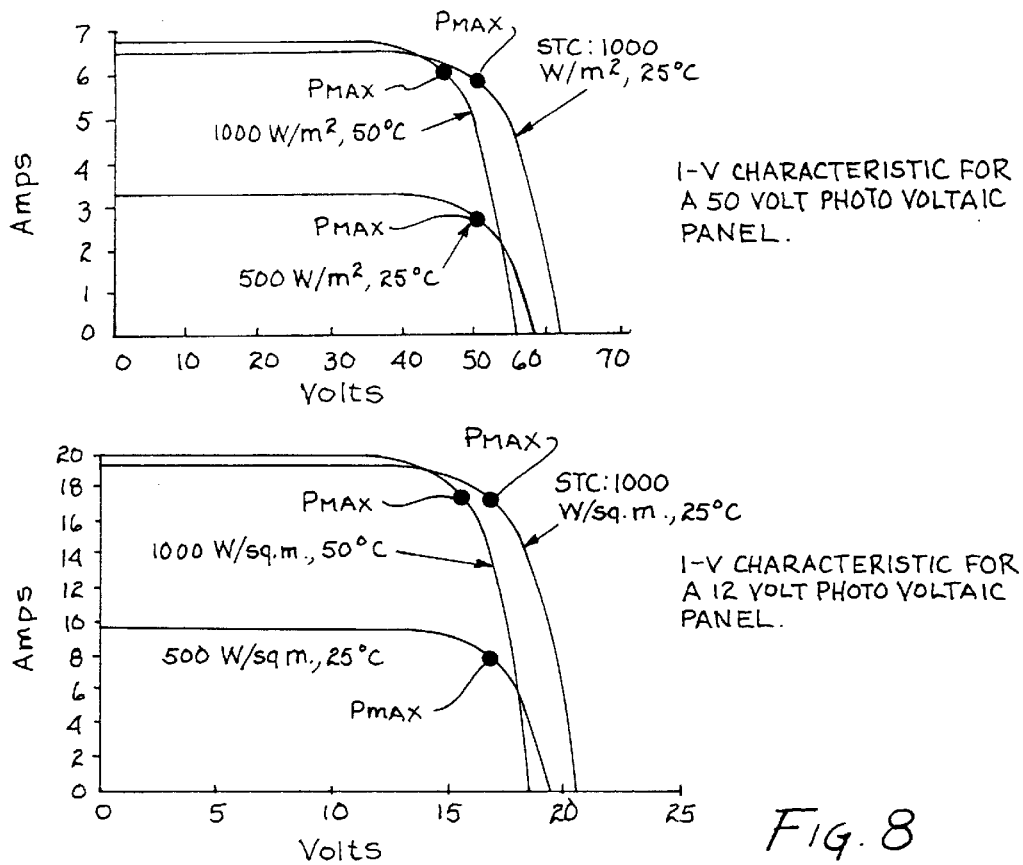
FIG. 8 illustrates the I–V characteristics of two different photo voltaic panels.

The I–V characteristic of two different photo voltaic panels are shown in FIG. 8. The top graph is the I–V characteristic for a 50 V photo voltaic panel and the bottom graph is for a 12 V photo voltaic panel. Both graphs show how the I–V characteristic varies with cell temperature and the amount of insolation on the panel. The plots show the location of the maximum power points ($P_{max}$) for each curve. Note that for all curves, when the panel is operating at the maximum power point, a small increase in current drawn from the panel results is a very large decrease in panel voltage. With the charger shown in FIG. 7, when there is a slight negative $\Delta V$, the circuit requires the photo voltaic current to increase. This increase in photo voltaic current causes a further decrease in photo voltaic voltage. The circuit responds to the decreased voltage by asking for more current which further decreases the photo voltaic voltage. Eventually the photo voltaic array clamps at a maximum current with a small photo voltaic voltage, typically 6 V or less. This point is far from the maximum power point and delivers a minute amount of power. Thus we see that a current mode topology used with the feedback signals attendant the circuit shown in FIG. 7 will respond to a negative change in photo voltaic voltage by causing the photo voltaic panel to clamp at maximum panel current and low panel voltage resulting in a very small amount of power being extracted from the panel. This instability cannot be easily controlled by software.

Figure 9:
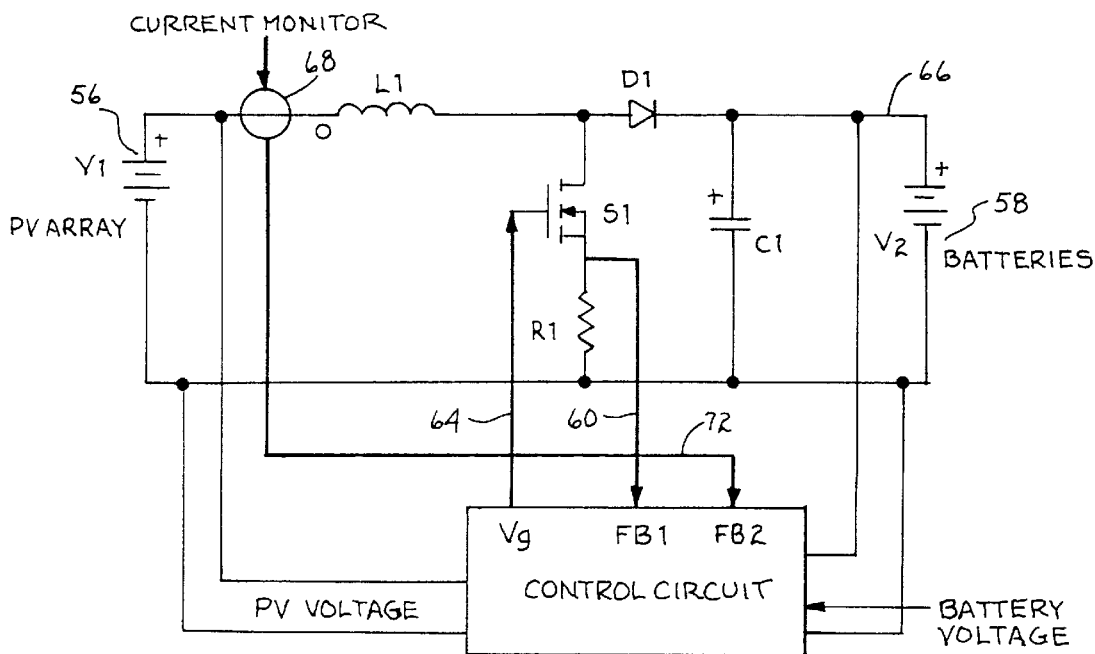
FIG. 9 illustrates a charger for regulating the input current.

To avoid this problem, the feedback connection shown in FIG. 7 can be changed to monitor the average current from the source. The circuit for a charger 70 embodying this topology is shown in FIG. 9. If there is a small change in input voltage, the circuit keeps the input current at the same average value and does not cause the clamping behavior as seen in the topology of the circuit for charger 50 shown in FIG. 7. In fact, for charger 70 (FIG. 9), changes in input voltage go relatively unnoticed by the circuit. The topology of charger 50 (FIG. 7) is essentially a constant output power circuit since the output voltage is kept relatively constant by the batteries. Since the topology of charger 50 (FIG. 7) controls constant power, the input current cannot be regulated. The topology of charger 70 (FIG. 9) regulates the input current. Since drawing too much current causes the clamping behavior in photo voltaic arrays, this topology eliminates the problem by regulating photo voltaic array current.

Three possible embodiments of the invention will be discussed below. Each uses the method of current mode feedback with one feedback signal being the instantaneous switch current and the other feedback signal being the average current drawn from the energy source. However, any topology that uses these two feedback signals in a current mode topology would be considered an embodiment of the invention.

Figure 10:
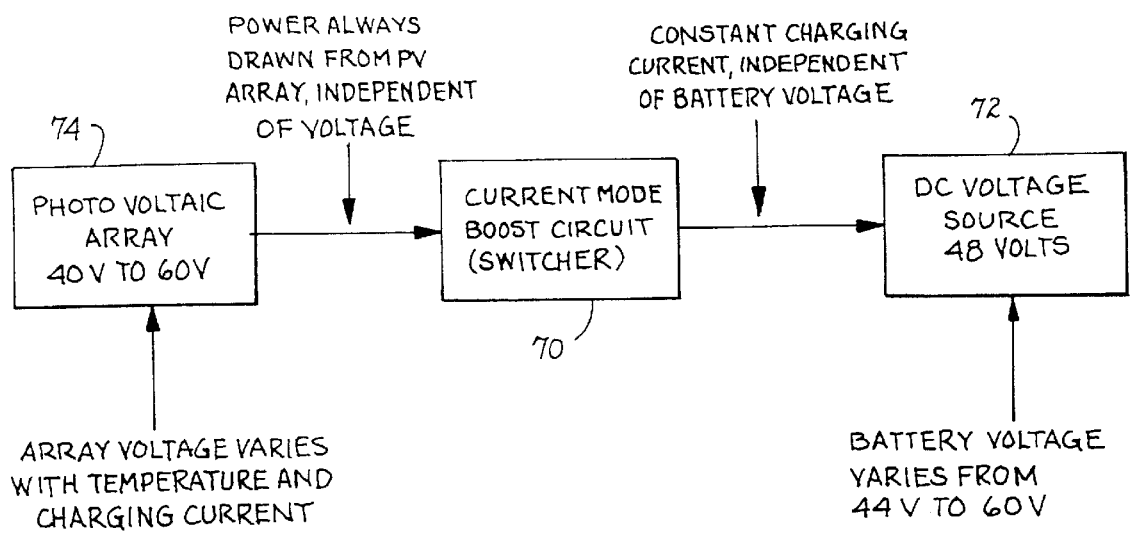
FIG. 10 illustrates a simplified current mode boost circuit.

A first embodiment identified as Current Mode Boost Topology is shown in FIG. 10 as a block diagram of a 48 volt system. A charger, labeled as Current Mode Boost Circuit 70 provides several functions: a) It allows charging of battery 72 when the photo voltaic voltage is less than the battery voltage; b) The current drawn from the energy source (an array of photo voltaic panels 74 in this case) is controlled by the boost circuit; c) The current can be selected to achieve maximum power from the photo voltaic panel.

The circuit topology for this block diagram is shown in FIG. 9. This is a topology similar to boost converter topologies used in current mode boost DC-DC voltage converters. For a boost DC-DC voltage converter, the input voltage (photo voltaic panel) is less than the output voltage (battery voltage). For current mode boost DC-DC voltage converters, the controller monitors the switch current and output voltage and maintains constant peak switch current and constant output voltage. The purpose of a DC-DC voltage converter is to maintain constant output voltage.

We are using this topology differently. The battery voltage is constant and does not need to be controlled. Our circuit monitors the instantaneous switch current and average input current, and maintains constant peak switch current and constant average input current through PWM control. We believe that this topology used with current mode control that controls the peak switch current and average input current to be unique. Although a boost topology works best at lower system voltages, it can be applied to high voltages as well.

Figure 11:
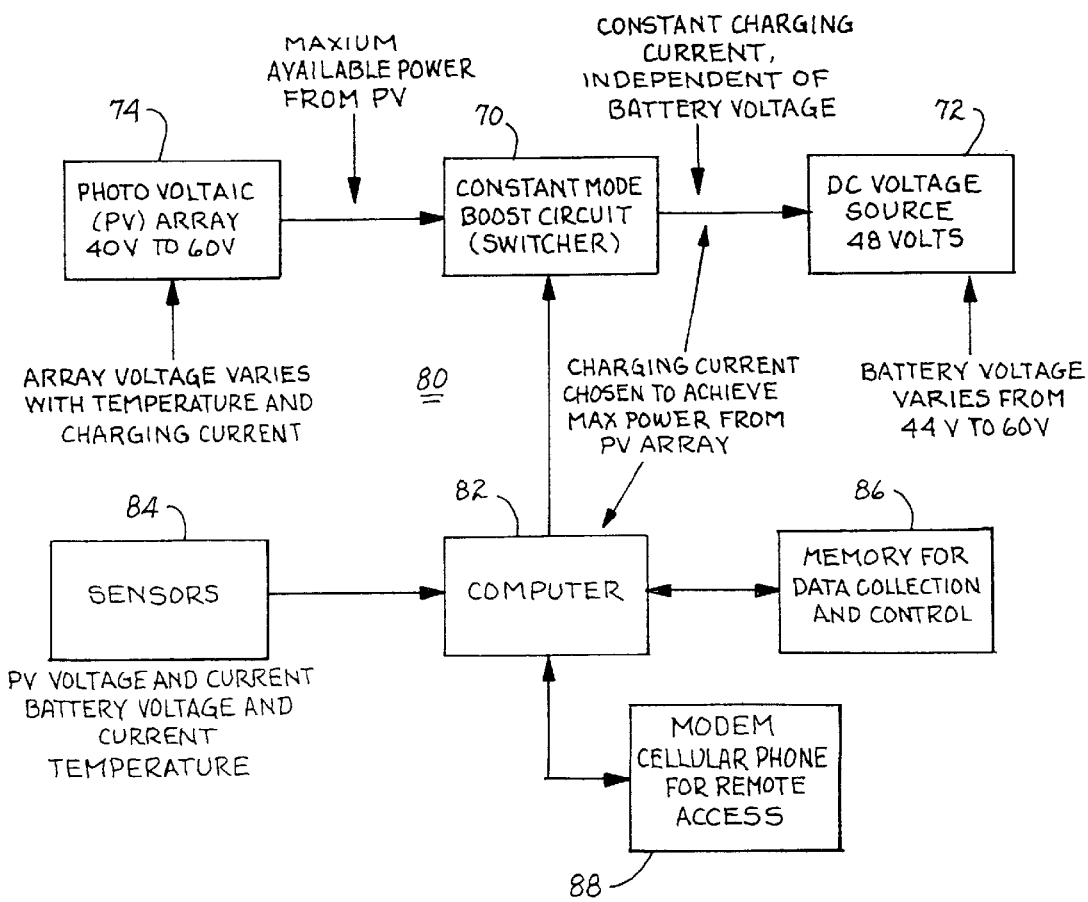
FIG. 11 illustrates use of a computer to control the operation of the charger depicted in FIG. 10.

The complete charger 80 is shown in FIG. 11. A computer 82 is used to control the behavior of the boost converter. The computer provides the following functions:

1) It monitors the output of several sensors 84. These may include, but are not limited to the photo voltaic voltage and current, battery voltage and charging current, battery temperature, photo voltaic temperature, and ambient temperature.

2) Data collection: The quantities monitored/measured can be saved in memory 86.

3) Variable charging algorithm: The charging current can be chosen according to different criteria and can be changed by software. Examples are: (1) Charge using maximum power available from photo voltaic; (2) Charge using an algorithm specified by a specific battery manufacturer.

4) A MODEM 88 for a cellular phone is provided to allow for: (1) the data to be downloaded remotely; (2) the charger behavior and charging algorithm to be changed remotely; and (3) the charger algorithm to be customized for each user. This is unique among chargers.

Figure 12:
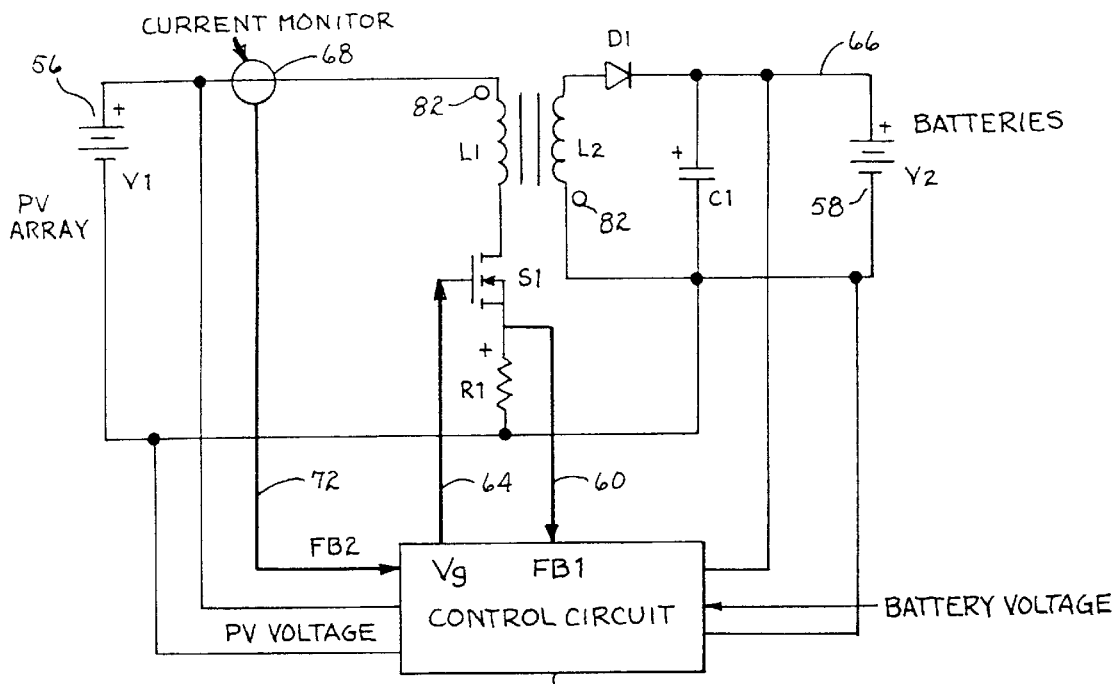
FIG. 12 illustrates a charger using a flyback topology for regulating the input current.

A second embodiment identified as Current Mode Flyback Topology is shown in FIG. 12. It uses the same basic structure as shown in the block diagrams in FIG. 10 and FIG. 11 except that the block labeled Current Mode Boost Circuit would be labeled as Current Mode Flyback Circuit. We see once again that this circuit monitors the peak switch current and the average current drawn from the power source. This embodiment could be used for different voltage and current levels than the boost topology shown in FIG. 9. However, the method behind both embodiments is equivalent.

Figure 13:
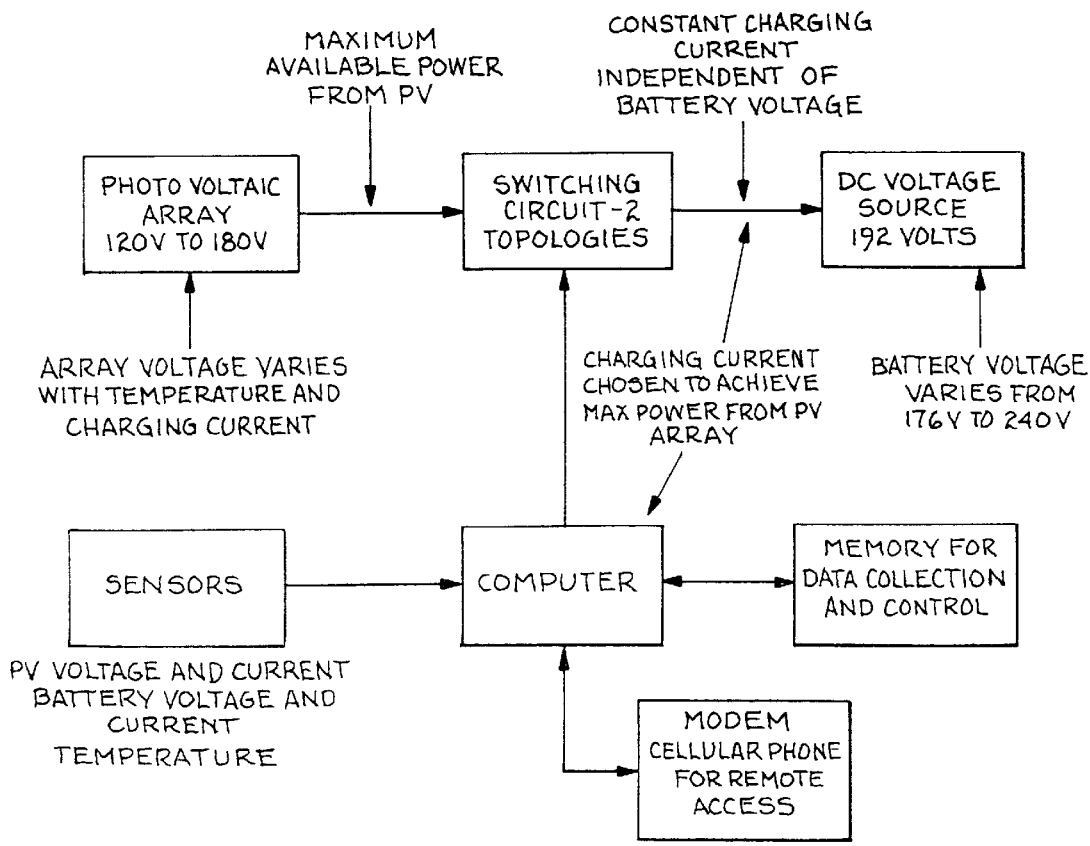
FIG. 13 illustrates a charger similar to the charger shown in FIG. 11 except for higher input/output voltages.

A third embodiment identified as Current Mode Push-Pull Buck Boost Topology is shown in FIG. 13 for use with higher voltage systems. This system is essentially the same as the one shown in FIG. 11 but the photo voltaic array and battery voltages are higher. In almost all cases the battery voltage is higher than the photo voltaic voltage. The chargers discussed here still use the basic idea of converting power supplied in the form of a voltage source from the photo voltaic panel to power in the form of a current source to charge the batteries. A computer provides the same functionality as was discussed for the circuit block diagram shown in FIG. 11.

Figure 14:
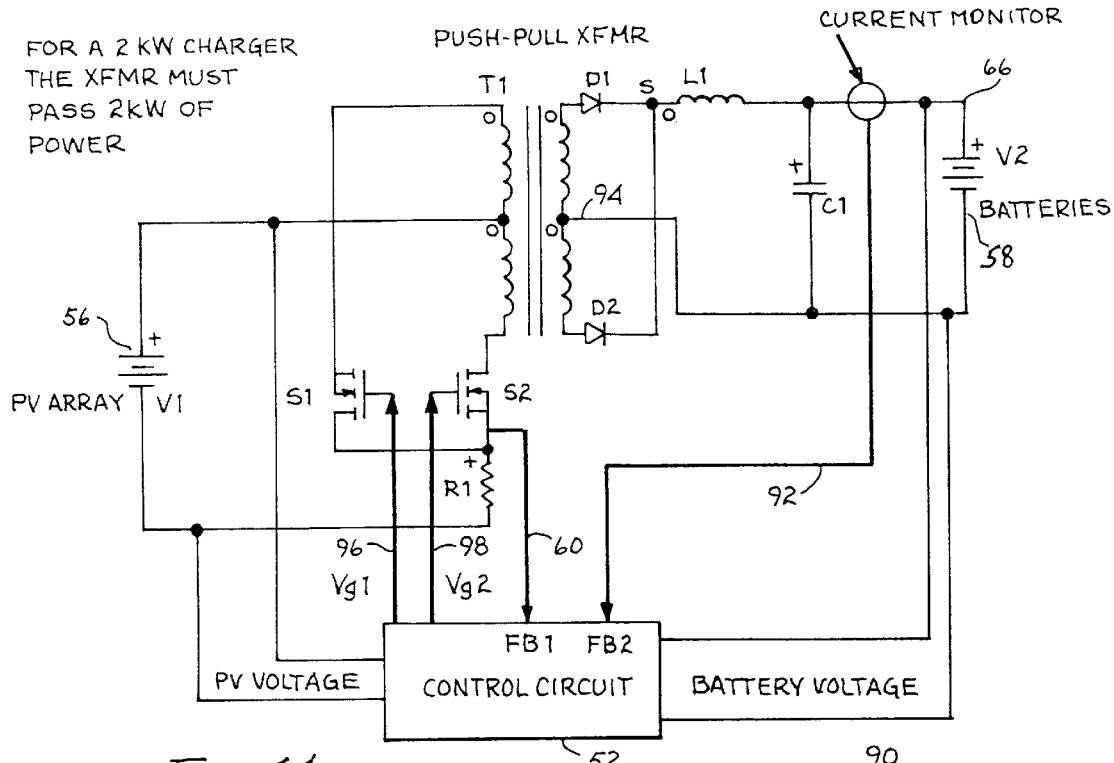
FIG. 14 illustrates a charger using a push-pull topology for regulating the charging current.

The additional unique items here are four additional circuit topologies. FIG. 14 shows a topology that uses a transformer. This circuit is also a commonly used topology for DC-DC voltage converters. For DC-DC voltage converters, the controller monitors the switch current and output voltage, and maintains constant peak switch current and constant output voltage. The purpose of a DC-DC voltage converter is to maintain constant output voltage.

We are using this topology differently from a conventional push-pull DC-DC voltage converter. The battery voltage (output voltage) is constant and does not need to be controlled. Our circuit monitors the switch current and output current, and maintains constant peak switch current and constant average output current. We believe that this topology used with current mode control that controls the peak switch current and average output current to be unique.

As with charger 50 shown in FIG. 7, charger 90 shown in FIG. 14 does not lend itself to maximum power tracking of photo voltaic panels. To optimize the circuit, the current monitor is moved from monitoring the battery current to monitoring the photo voltaic current. The topology of such a charger 100 is shown in As FIG. 15. Since this circuit controls the current drawn from the photo voltaic array, it allows control of the power drawn from the photo voltaic array and facilitates maximum power tracking.

Figure 16:
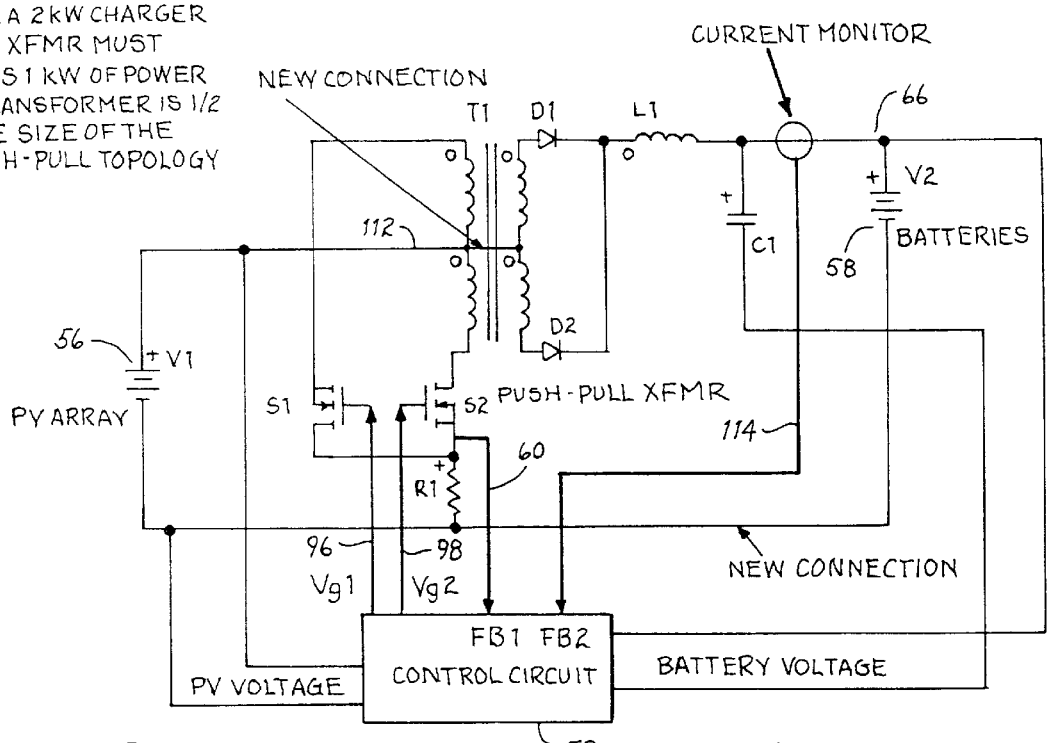
FIG. 16 illustrates a charger capable of using a transformer of much smaller size than the transformer shown in FIGS. 7 and 14.

FIG. 16 shows a topology of a charger 110 that uses a transformer T1 in a unique topology. This circuit is not commonly used in DC-DC voltage converters. Our circuit monitors the switch current and output current, and maintains constant peak switch current and constant output current. We believe (1) that this topology is unique, and (2) that this topology used with current mode control that controls the peak switch current and output current to be unique.

Figure 15:
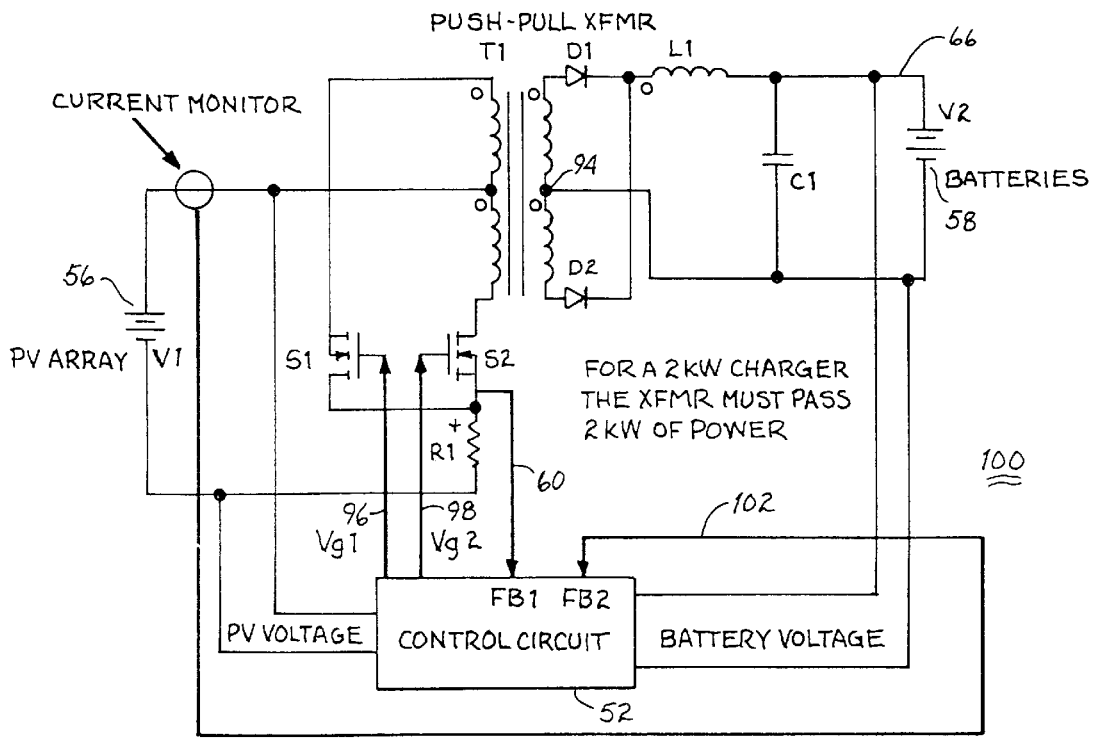
FIG. 15 illustrates a charger using a push-pull topology for regulating the input current.

The benefit of the charger shown in FIG. 16 is that, for a specific power level, the power supplied by the transformer is one half the power that must be supplied by the transformers of the chargers shown in FIG. 14 and FIG. 15. This greatly reduces the cost of the design and increases the efficiency.

Figure 17:
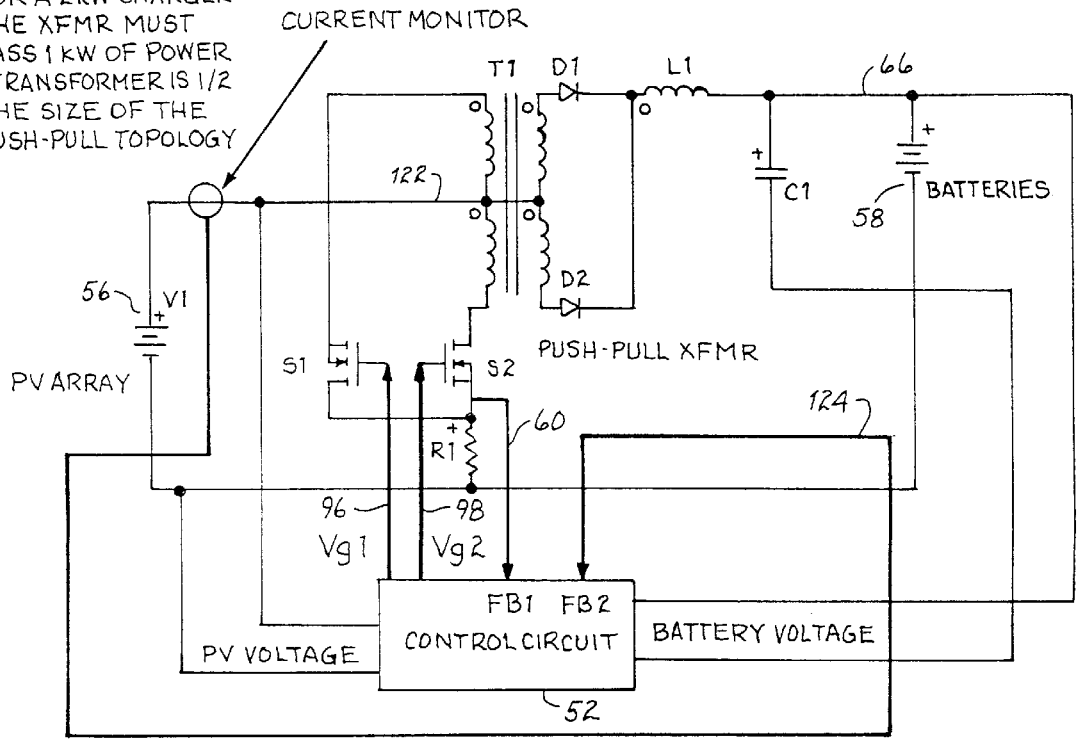
FIG. 17 illustrates a charger similar to the charger shown in FIG. 16 except that the input current is regulated.

As with the chargers shown in FIGS. 7 and 14, the charger shown in FIG. 16 does not lend itself to maximum power tracking of photo voltaic panels. To optimize the circuit, the current monitor is moved from monitoring the battery current to monitoring the photo voltaic current. The topology for such a charger 120 is shown in FIG. 17. Since this circuit controls the current drawn from the photo voltaic array, it allows control of the power drawn from the photo voltaic array and facilitates maximum power tracking.

Details of the circuits and their operation will be described in further detail below. Furthermore, the waveforms of the signals attendant the circuits will be reviewed.

FIG. 7 illustrates the basic circuit building blocks for current mode battery charger 50. Control circuit 52 includes a computer for data collection and a current mode pulse width modulator (PWM) integrated circuit (IC) for controlling the action of a switching device, such as switch (S1), which may be a MOSFET as shown. The purpose of the computer is to monitor the input and output power of charger 50 and to adjust the reference signal to the current mode PWM IC so that the current drawn extracts maximum power from photo voltaic (PV) array 56. The reference signal to the PWM IC is an analog voltage between 0 and 5 V. A higher reference voltage draws higher average current from the PV array and higher average charging current to batteries 58. The behavior of the circuit is controlled by the PWM IC. This IC is a typical PWM current mode control IC such as the industry standard UC 3825. This IC has a single control input (the reference signal is not shown) that is used to specify the average current the switching circuit is to draw. This signal is provided by the microprocessor. The PWM IC has two feedback inputs (FB1 and FB2) on conductors 60, 62, respectively. Signal FB1 measures the instantaneous switch current (the voltage across R1). Signal FB2 is the voltage feedback signal and in a typical power supply circuit is used to feedback the output voltage. The output signal Vg of the control circuit on conductor 64 is the gate drive output of the current mode PWM IC. When this output is high (Vg equal to 12 to 15 V), switch S1 will turn on and conduct. When Vg is low (Vg close to zero), switch S1 will turn off and no longer be in a conducting state.

The operation of the circuit is as follows. When switch S1 is closed, the voltage of V1 will appear across inductor L1 (assuming that resistor R1 is small). This causes the current through the inductor to rise in the form of a ramp. The equation that governs the current through inductor L1 is:

$$I(L1) = \frac{1}{L1}\int_{to}^{t} V_{L1}(t)\,dt + I(to) \qquad \text{(EQUATION 1)}$$

$V_{L1}$ is the voltage across inductor L1. Since resistor R1 is small, the voltage across inductor L1 can be assumed to be approximately equal to the PV array voltage V1, which is constant. Since the voltage produced by a PV array is relatively constant relative to the 50 kHz switching frequency of the charger, the voltage across inductor L1 can be assumed to be constant at V1. With $V_{L1}$ constant at V1, Equation 1 reduces to:

$$I(L1) = \frac{V_1}{L1}(t - to) + I(to) \qquad \text{(EQUATION 2)}$$

This is the equation for an increasing ramp and I(to) is the initial condition of the current. Thus, we see that when switch S1 is closed, the current through inductor L1 is an increasing ramp with slope proportional to the PV array voltage. A higher PV array voltage yields a steeper ramp and a lower PV array voltage yields a less steep ramp.

The property of inductor L1 is such that the current may not change instantaneously. When switch S1 opens, current through inductor L1 must continue to flow. When switch S1 is open, current through inductor L1 will flow through diode D1 and into battery 58. When current flows through the diode, assuming that the voltage across the diode is constant and small, the voltage across inductor L1 is approximately equal to V1−V2. For a boost converter, V1 is smaller than V2 so the voltage across inductor L1 is the opposite polarity when compared to the voltage across the inductor L1 when switch S1 was in the conducting state. V1 and V2 are relatively constant so the voltage across inductor L1 is basically constant. We can let $V_{L1}$ in Equation 1 be equal to V1−V2. Since these voltages are constant, solving Equation 1 when switch S1 is off yields:

$$I(L1) = \frac{V_1 - V_2}{L1}(t - to) + I(to) \qquad \text{(EQUATION 3)}$$

Since V1 is less than V2, Equation 3 is a ramp with a negative slope. Thus, when switch S1 is open, the current through the inductor is a decreasing ramp.

Figure 18A:
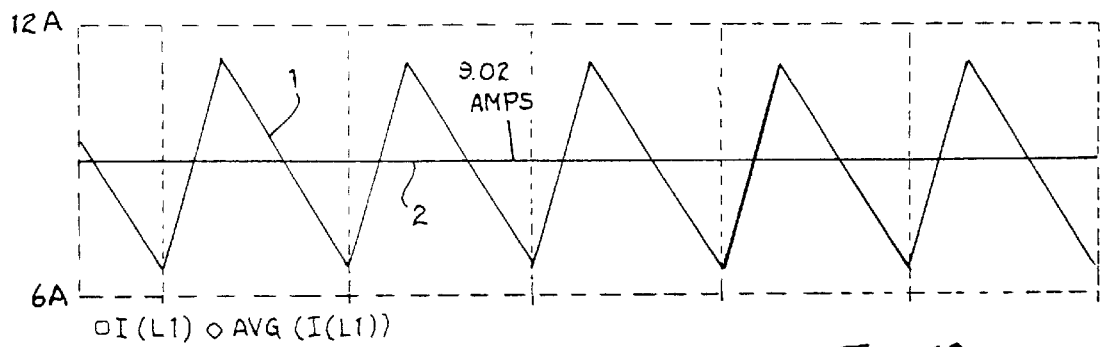
FIGS. 18$a$–18$d$ illustrate the waveforms for the charger shown in FIG. 7 operating in the continuous mode.

A typical current wave form for the inductor L1 is shown in FIG. 18a, waveform 1. The waveform shown is for a switching circuit operating in the continuous mode of operation. In this mode, the current through the inductor never goes to zero. In discontinuous mode, the current through the inductor is given by similar equations, however, the point of minimum inductor current is zero. Our invention can be run in either continuous or discontinuous modes.

Figure 18B:
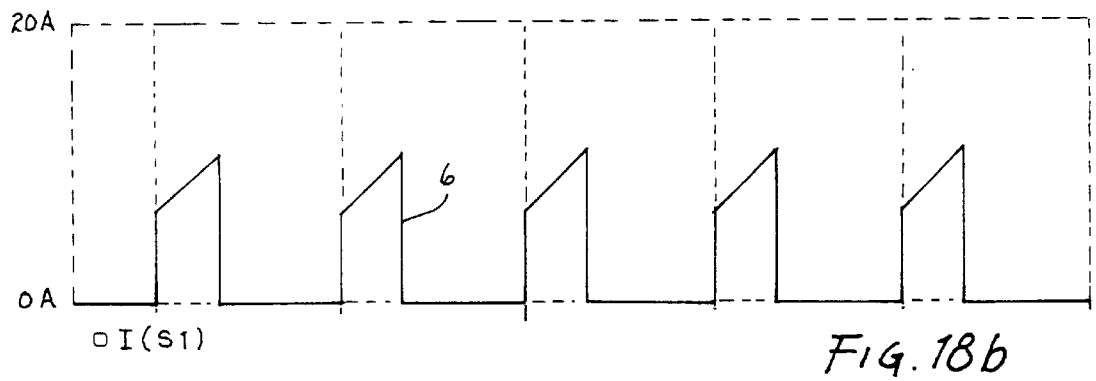
Figure 18C:
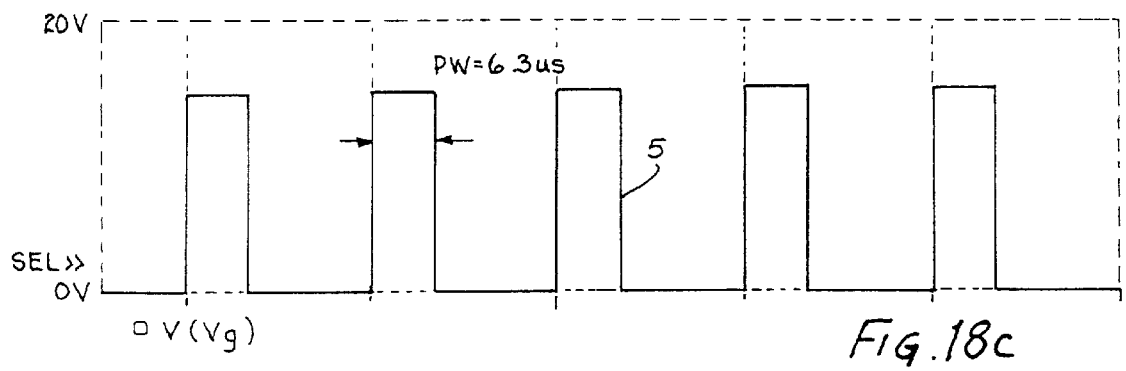
Figure 18D:
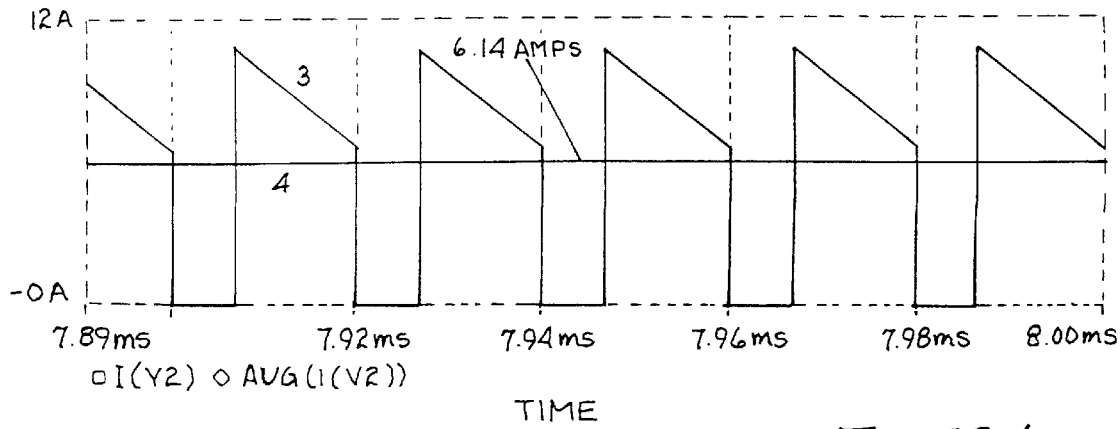

Thus far, the discussion shows how the circuit determines the inductor current. The following is a discussion of how the current mode PWM IC regulates the operation of the circuit. When switch S1 is closed, the current through inductor L1 increases. When switch S1 is closed, diode D1 is off and the inductor current is equal to the switch current. The switch current is shown in FIG. 18b, waveform 6. The control for the switch is shown in FIG. 18c, waveform 5. When the voltage of waveform 5 is high (15 V in this example), switch S1 is on and the inductor current is equal to the switch current. When the voltage of waveform 5 is low (0 volts in this example), switch S1 is off and the current through the switch is zero.

Referring again to FIG. 7, resistor R1 is small enough so that it does not affect the operation of the circuit. However, the voltage across resistor R1 is proportional to the current through switch S1. This voltage is provided to the current mode PWM IC by feedback signal FB1 on conductor 60. The PWM IC monitors the switch current (voltage across resistor R1). Switch S1 remains on to allow the current through inductor L1 to increase. When the switch current, equal to the inductor current, reaches a peak value determined by the PWM IC, switch S1 turns off and inductor L1 forces current into the batteries 58. The switch remains off for the remainder of one 50 kHz PWM period. It is important to note that the PWM IC controls the peak inductor current. The point that the PWM IC chooses to be the peak inductor current (also switch S1 current) is determined by feedback signal FB2 on conductor 62 . Feedback signal FB2 is a voltage proportional to the average charging current into batteries 58 (V2). A current mode feedback method works as follows. If the voltage provided by feedback signal FB2 is too small when compared to the reference signal, the switch current (also inductor current) is allowed to increase. A larger inductor current will deliver more current to the batteries. More current to the batteries will result in a larger feedback signal FB2. Feedback signal FB2 is compared internally to a reference signal provided by the microprocessor. With negative feedback, the peak inductor current will be such that feedback signal FB1 on conductor 60 will equal the internal reference signal provided by the microprocessor. If a larger charging current is desired, the internal reference signal is increased. This increase will allow for a larger peak inductor current. A larger peak inductor current will deliver more average charging current to batteries 58.

Capacitor C1 is not necessary in an ideal circuit where there is no inductance in the connecting conductor 66 of FIG. 7. However, in a real circuit, charger 50 may be many feet away from batteries 58. This results in a large inductance for conductor 66. This inductance could cause large voltage spikes at point 2 in the circuit. To eliminate these spikes, capacitor C1 is added. This capacitance must be large enough to swamp out the inductance of conductor 66. The ripple current specification of this capacitor must be chosen to be one half of the maximum average battery current.

The operation of the circuit for charger 50 shown in FIG. 7 maintains constant average charging current. The circuit includes a current monitor device, monitor 68, that monitors the average charging current and the current mode PWM IC maintains the peak inductor current such that the average charging current is constant. In a classic current mode PWM power supply, feedback signal FB2 on conductor 62 is the output voltage. If this were the case, the circuit would control the peak inductor current such that the output voltage would remain constant. A circuit of this type is well documented in the literature. In our circuit, the output voltage (V2) is a battery 58. The property of a battery is that its voltage is constant and there is no need to regulate the voltage. This allows use of feedback signal FB2 on conductor 62 to represent the average charging current produced by monitor 68. Thus, this circuit is very similar to a classical current mode voltage power supply except that charging current rather than output voltage is regulated.

Figure 19A:
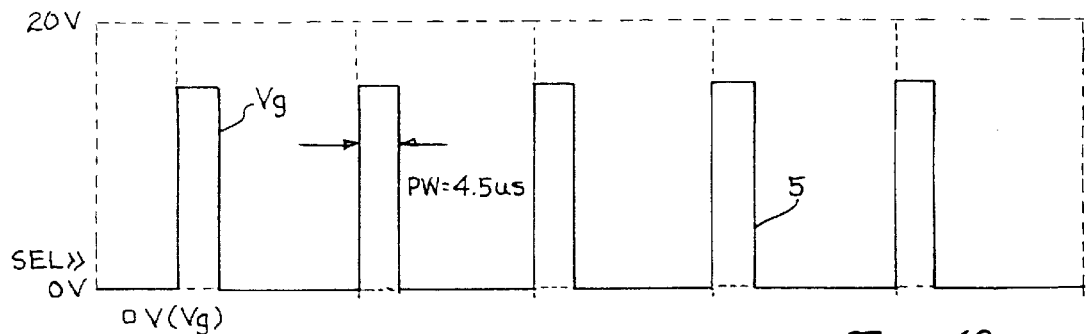
FIGS. 19$a$–19$d$ illustrate the waveforms attendant the charger shown in FIG. 7.
Figure 19B:
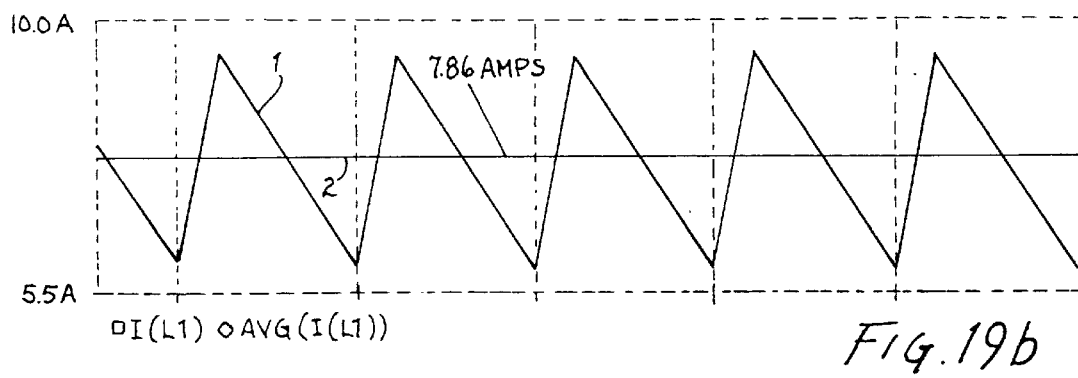
Figure 19C:
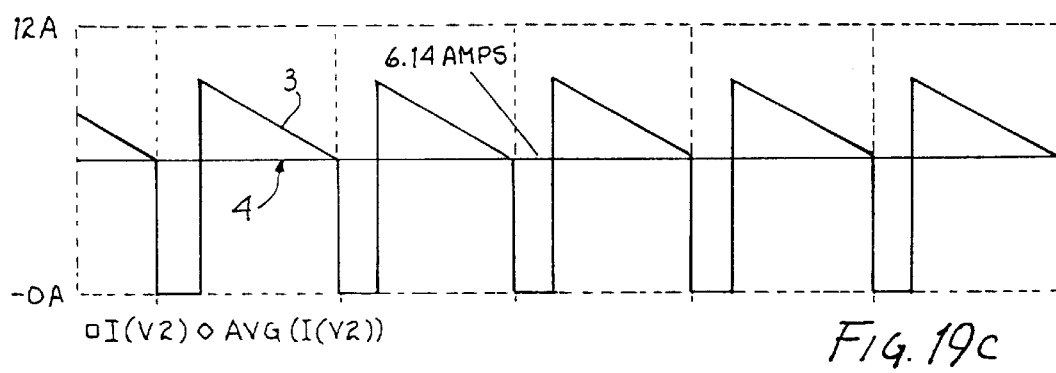
Figure 19D:
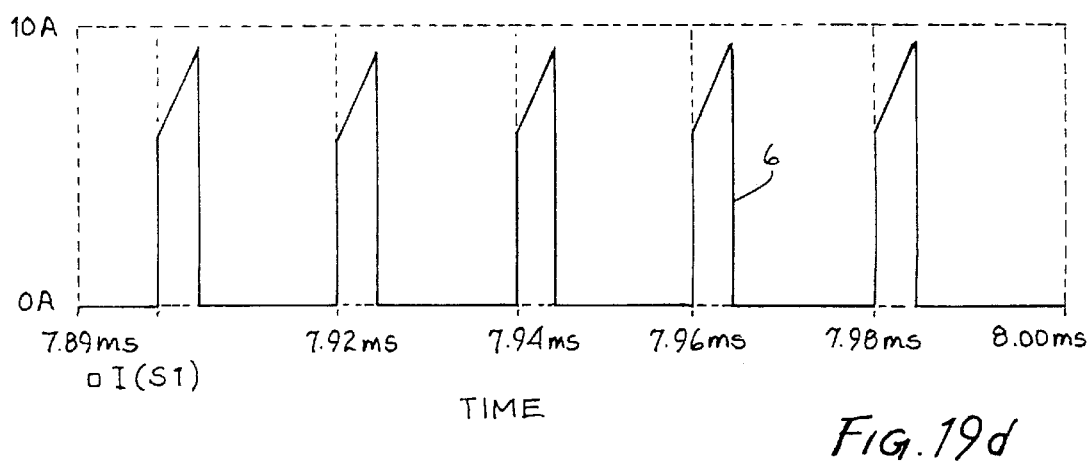
Figure 20A:
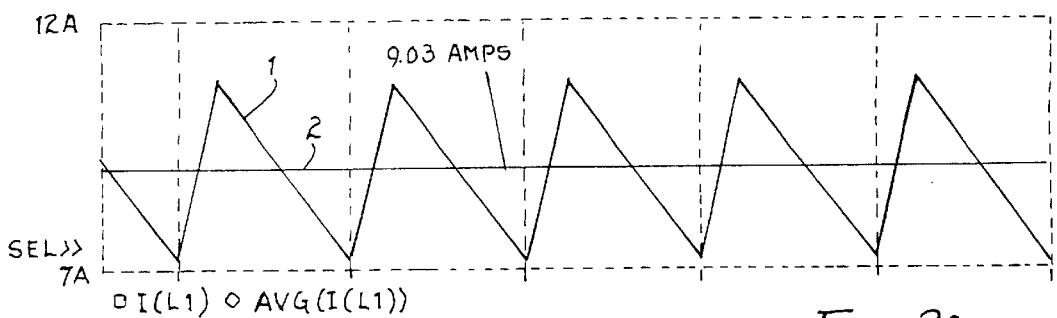
FIGS. 20$a$–20$d$ and 21$a$–21$d$ illustrate waveforms attendant the charger shown in FIG. 9.
Figure 20B:
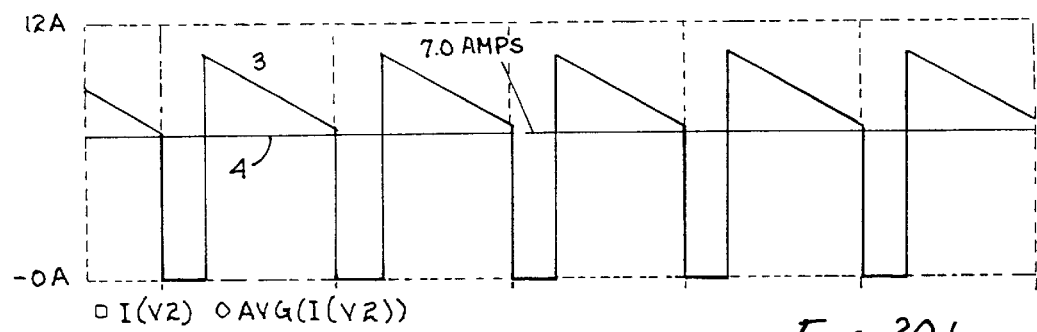
Figure 20C:
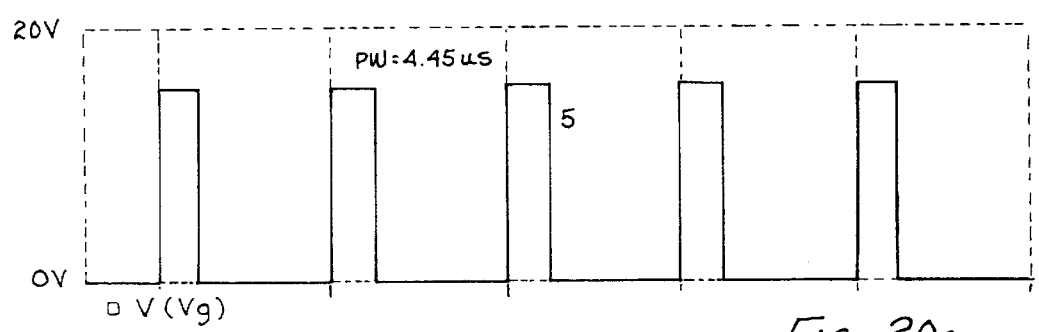
Figure 20D:
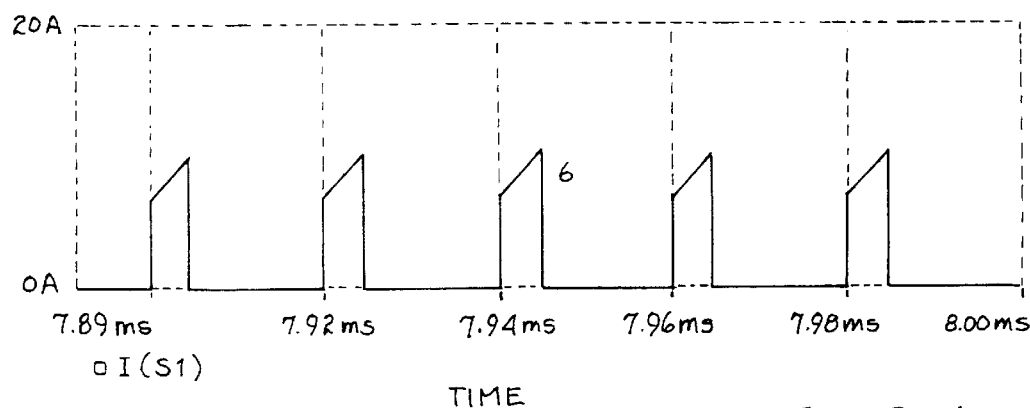
Figure 21A:
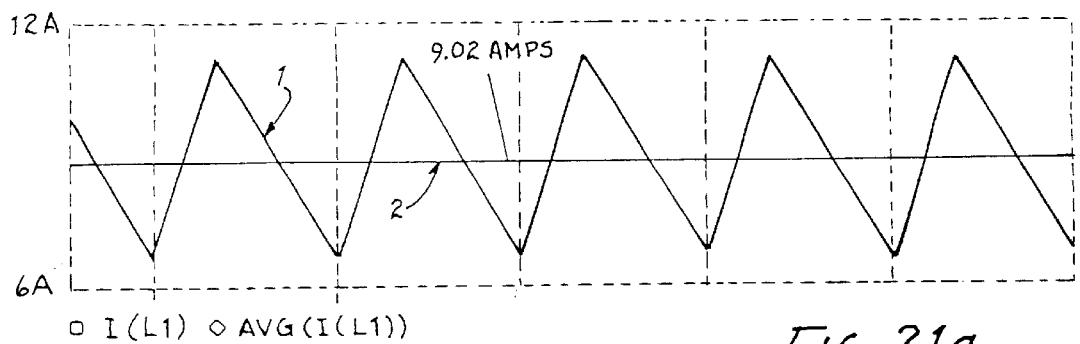
Figure 21B:
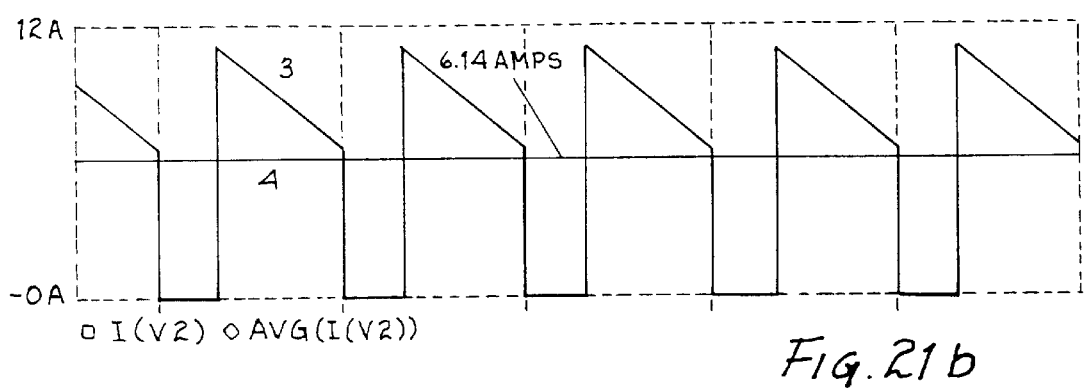
Figure 21C:
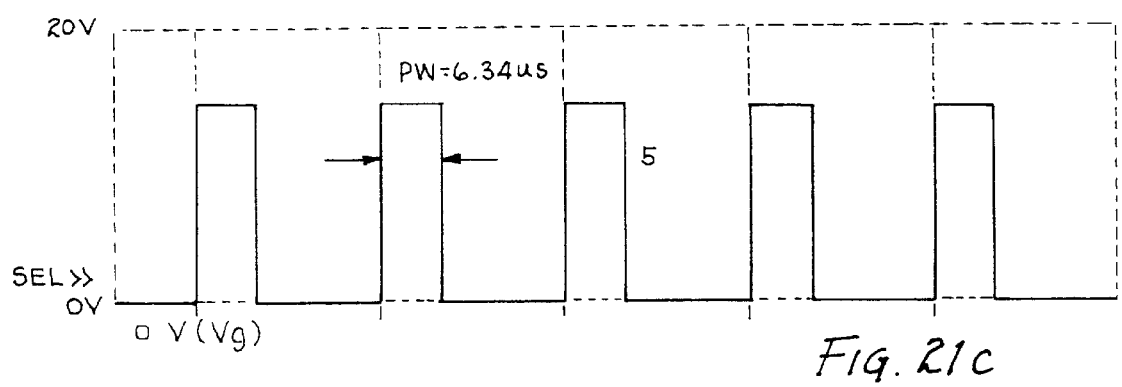
Figure 21D:
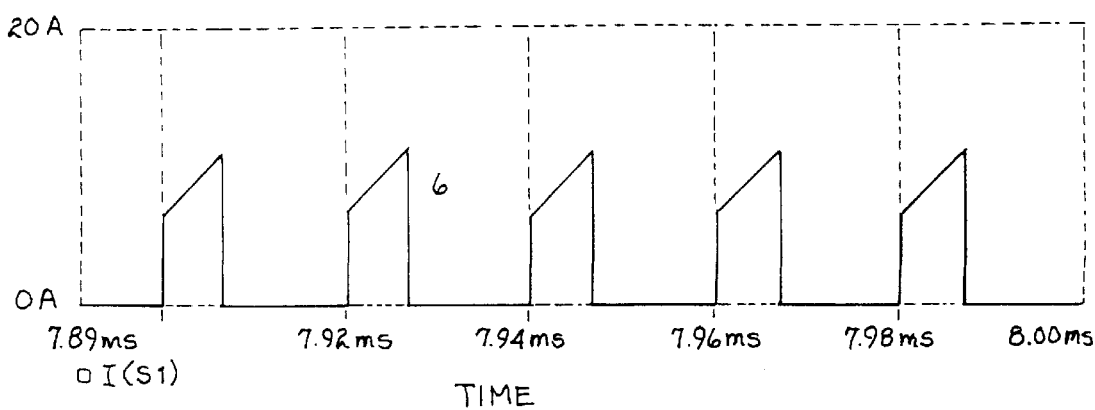

Referring to FIGS. 19*a*–19*c*, the waveforms attendant charger 50 illustrated in FIG. 7 will be described. Waveform 5 shown in FIG. 19*a* is the switch (S1) control voltage (vg). When this voltage is high, the switch is on. When the voltage is low, the switch is off. Waveform 1 shown in FIG. 19*b* is the inductor current and waveform 2 is the time average of the inductor current, waveform 1. Waveform 3 shown in FIG. 19*c* is the charging current (current into the batteries 58) and waveform 4 is the time average of waveform 3. Waveform 6 shown in FIG. 19*d* is the switch current. When waveform 5 is high, switch S1 is on. In this state, diode D1 is off and the charging current is zero. Also in this state, waveform 1 (the current through inductor L1) is equal to waveform 6 (the current through S1). Thus, when switch S1 is closed, the inductor current increases and is equal to the switch current, and the charging current is zero. When waveform 5 is low, switch S1 is off. In this state, diode D1 is on and the charging current (waveform 3, FIG. 19*c*) is equal to the inductor current (waveform 1, FIG. 19*b*). Also in this state, the switch current is zero.

Charger 50 shown in FIG. 7 maintains a constant charging current. This circuit is very useful when the energy supply (V1) is well known and constant. If V1 is constant (such as a power supply powered from the line), the circuit of FIG. 7 can be used to closely control the charging current of V2. A circuit of this type is very useful when the charging current is the most important parameter.

With chargers powered by PV arrays 56, the most important parameter is maximum power extraction from the PV array, and charging current is only of concern when batteries 58 are near full charge. Charger 50 of FIG. 7 is not well suited for this application since it does not control the current from the PV array. A simple example that will illustrate this problem is shown in the comparison between the waveforms of FIG. 18 and FIG. 19. The waveforms shown in FIGS. 18*a*–18*d* are for V1=45 V and V2=60 V. The waveforms shown in FIGS. 19*a*–19*d* are for V1=50 V and V2=60 V. These waveforms are generated by charger 50 shown in FIG. 7. Starting with the waveforms shown in FIG. 19 where V1 is at 50 volts and V2 is at 60 V, the average charging current (waveform 4, FIG. 19*c*) is held constant at 6.14 A. With a charging current of 6.14 A into batteries 58 which are at 60 V, the charging power is 368.4 W. To maintain this power, with an input voltage (V1) of 50 V, the required input current is 7.86 A. An input voltage of 50 V and in input current of 7.86 A results in an input power of 393 W. Note that the input power is greater than the output power. This is expected since the circuit is not 100% efficient. To maintain the average input current of 7.86 A, a pulse width (waveform 5, FIG. 19*a*) of 4.5 $\mu$s is required. Suppose that V1 decreases from 50 volts to 45 volts. The waveforms for V1=45 volts are shown in FIGS. 18*a*–18*d*. The function of charger 50 is to maintain the average charging current (waveform 4, FIG. 18*d*) constant at 6.14 A. Since V2 is still at 60 V, the charging power is held constant at 368.4 W. Since the input voltage decreased and the input power is approximately equal to the output power, the input current must be increased. As a result, the average output current (waveform 4, FIG. 18*d*) is held constant by the circuit at 6.14 A. However, to keep the input power constant with reduced input voltage, the average input current (waveform 2, FIG. 18*a*) is increased to 9.02 A. An input voltage of 45 V and an input current of 9.02 A corresponds to an input power of 405 W. In order to increase the average inductor current (waveform 2, FIG. 18*a*), the peak inductor (L1) current was increased by increasing switch S1 on time (waveform 5, FIG. 18*c*). Increasing switch S1 on time (waveform 5) increases the duration and peak value of the switch (S1) current (S1).

As mentioned earlier, the above behavior is undesirable when used with PV arrays. If the PV voltage goes down due to decreased insolation, and the charging circuit asks for more current to keep the input power at the same level, the increase in current will cause the panel voltage to drop. Charger 50 shown in FIG. 7 senses the further decrease in panel voltage and asks for still more input current, causing a further drop in PV array voltage. Thus, this circuit can cause the PV arrays to clamp at minimum voltage and maximum current. This clamping action is undesirable and can be fixed by charger 70 shown in FIG. 9.

Charger 70 (FIG. 9) works almost the same as charger 50 (FIG. 7) and common elements have the same reference numerals. Both chargers use a current mode control PWM IC. When a current mode PWM IC is used to control the output voltage of a power supply, feedback signal FB2 on conductor 72 monitors the output voltage and the peak inductor (L1) current is controlled to maintain a constant output voltage. In charger 50 (FIG. 7), feedback signal FB2 on conductor 62 monitors the average charging current and the peak inductor (L1) current is controlled to maintain a constant average charging current. In charger 70 (FIG. 9), feedback signal FB2 on conductor 72 monitors the average input current at monitor 68, or the current provided by PV array 56. Since the average input current is monitored, the peak inductor (L1) current is controlled so that the average input current is held constant.

Charger 70 allows the input current to be held constant independent of the input voltage. If a change in input voltage occurs, the peak inductor current may change, but the average input current (also the inductor current) will be held constant. An example of this can be seen by comparing the waveforms of FIGS. 20*a*–20*d* and FIGS. 21*a*–21*d*. These waveforms are generated by charger 70 (FIG. 9). Note that these waveforms are basically the same as those shown in FIGS. 18*a*–18*d* and 19*a*–19*d* for charger 50. The primary differences between FIGS. 20*a*–20*d* and 21*a*–21*d* when compared to FIGS. 19*a*–19*d* and 20*a*–20*d* result because one circuit maintains constant charging current (FIGS. 7, 18*a*–18*d*, 19*a*–19*d*) and the other maintains constant input current (FIGS. 9, 20, 21).

The waveforms shown in FIGS. 20*a*–20*d* are based on the values of V1 equals 50 V and V2 equals 60 V. The charger maintains a constant input current (waveform 2, FIG. 20*a*) of 9.03 Amps. This corresponds to an input power of 451 W (50 V times 9.03 Amps). The average output current (waveform 4, FIG. 20*b*) is equal to 7.0 A corresponding to a power of 420 W (60 V times 7.0 amps). Note that the input power is slightly higher than the output power due to losses in the circuit. FIGS. 21*a*–21*d* show the waveforms of charger 70 when the input voltage drops to 45 V. Herein, the input current is still held constant at 9.02A (waveform 2, FIG. 21*a*). However the average output current (waveform 4, FIG. 21*b*) was allowed to change. The charger maintains constant input current. The input power is 407 W (45 V times 9.02 Amps), and the output power is 368 W (6.14 Amps times 60 V).

Note that the waveforms of FIGS. 20*a*–20*d* and 21*a*–21*d* show that the input and output power change when the input voltage changes. This is because charger 70 (FIG. 9) maintains constant input current. If the input current is held constant and the input voltage changes, the input power must change. This is different from the operation of charger 50 (FIG. 7) which maintained constant output current. In charger 50, the output voltage is held constant by the battery and the output current is held constant by the charger. Since both voltage and current are held constant, the charger maintains constant output power.

Four preferred embodiments of the invention are presented. However, circuit topology is not as important as the methodology, which methodology is the use of current mode control with one feedback signal being the instantaneous switch current and another feedback signal being the average current from the energy source. Circuit topologies of a boost converter, flyback topology, push-pull topology, and push-pull-buck-boost topology will be illustrated and described. All of the circuits' switching characteristics are similar, and all behave in the same manner when controlled with the current mode feedback method with one feedback signal (FB1) being the instantaneous switch current and the second feedback signal (FB2) being the average current from the energy source. The differences between the circuits are that some may be better suited for different voltage level applications. For example, the boost converter is usually used in low voltage applications, and the transformer topologies are better suited for the higher voltage applications. We will also show waveforms for a flyback topology, a push-pull topology, and a push-pull-buck-boost topology. It will become apparent from the waveforms that all of these topologies behave the same when used with current mode control with one feedback signal (FB1) being the instantaneous switch current and the second feedback signal (FB2) being the average current from the energy source. The switching-waveforms may be slightly different depending on the topology, but the behavior of the average input current and output current is the same.

Figure 22A:
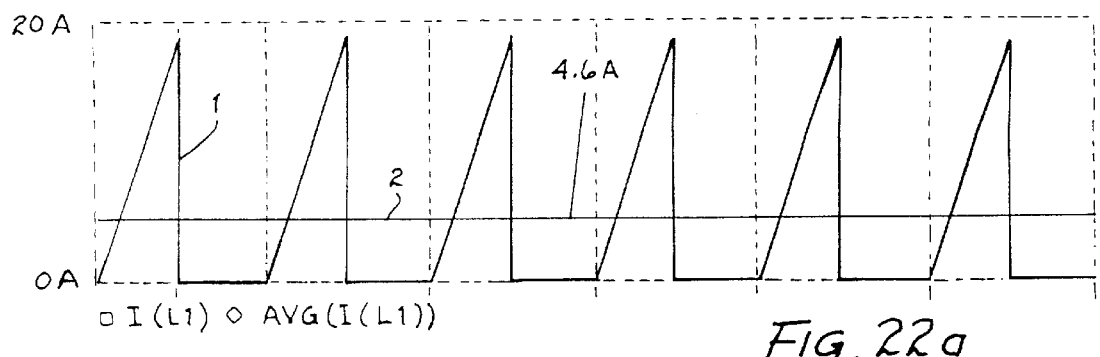
FIGS. 22$a$–22$d$ illustrate waveforms attendant the charger shown in FIG. 12.
Figure 22B:
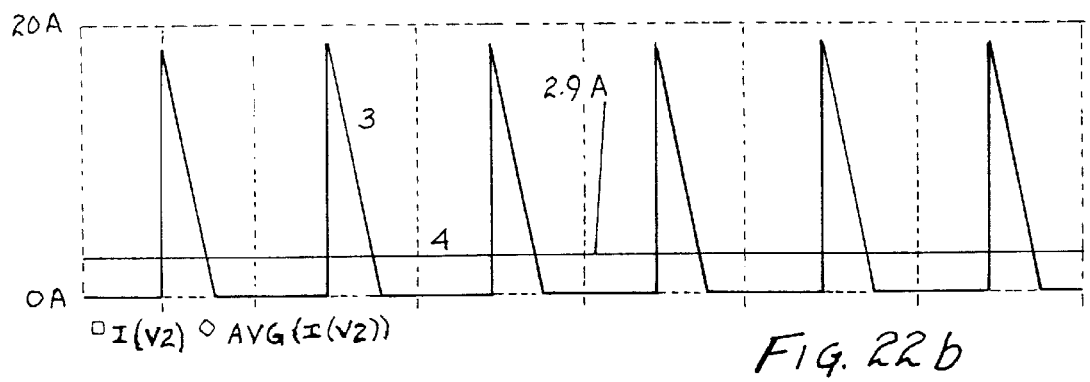
Figure 22C:
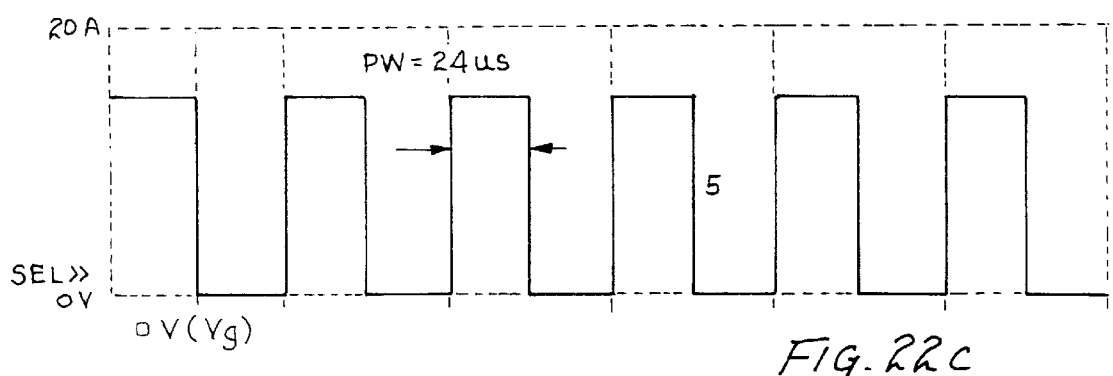
Figure 22D:
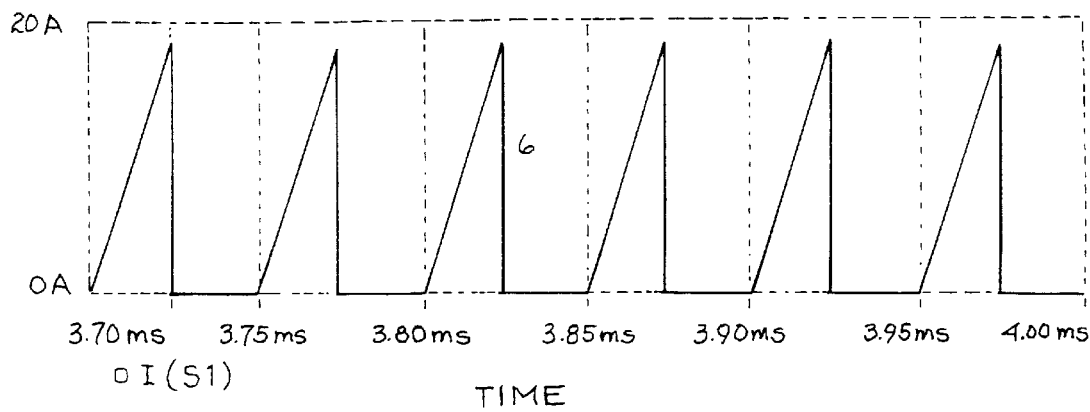

The flyback topology for charger 80 shown in FIG. 12 will be described first. The charger is almost exactly like charger 70 (the boost converter) if one considers inductor (L1) (see FIG. 9) as being split into two coupled inductors (L1 and L2) forming transformer T1. The waveforms for charger 80 are shown in FIGS. 22*a*–22*d*. When switch S1 is closed, current will flow through inductor L1 and switch S1. This is shown as waveforms 1 (FIG. 22*a*) and 6 (FIG. 22*d*). The current is a ramp starting at zero. Feedback signal FB1 on conductor 60 controls the peak switch current so that the average current (waveform 2, FIG. 22*a*) drawn from the energy supply (PV array V1) is constant. Waveform 5 (FIG. 22*c*) shows the gate control pulses for switch S1. When Vg is high, the switch is on and current flows through inductor L1, switch S1, and resistor R1. The current is in the form of an increasing ramp and governed by Equation 2. Resistor R1 is a current sensing resistor and is small. It is assumed that the voltage across resistor R1 is so small that we can neglect it in the analysis. While current is flowing through inductor L1, energy is stored in the transformer (T1) core and magnetic flux flows through the transformer (T1) core. The flux in a core cannot go to zero instantaneously, similar to the law that current in an inductor cannot go to zero instantaneously. When switch S1 opens, the current through inductor L1 must go to zero. However, the flux in the core of T1 cannot go to zero instantaneously, and current is forced through inductor L2. Since current was entering the dot terminal 82 of inductor L1 when the core was charged, current will enter the dot terminal 84 of inductor L2 when current is forced through it. Current can flow through diode D1 in this direction, and the energy stored in the core as magnetic flux is delivered to batteries 58 through inductor L2 and diode D1. The current through inductor L2 is shown as waveform 3 in FIG. 22*b*. The current shown is both the inductor (L2) current, diode (D1) current and battery 58 current. Waveform 4 is the time average of waveform 3 (see FIG. 22*b*). Looking at waveforms 1, 5, and 3, we see that when waveform 5 is high (FIG. 22*c*), current flows through inductor L1, charging the core. When waveform 5 goes low, the current through inductor L1 goes to zero, and the current through inductor L2 immediately jumps to its peak value and then discharges to zero. The waveforms show the operation of this circuit in a discontinuous mode.

The waveforms shown in FIGS. 22*a*–22*d* are for a 1:1 turns ratio between inductors L1 and L2, and with V1=45 V and V2=60 V. Since the turns ratio is 1:1, the peak values of current for waveforms 1 and 3 (FIGS. 22*a* and 22*b*) are the same. However, inductor L1 is charged by V1 which is 45 volts, and inductor L2 is discharged by V2 which is 60 V. Since V2 is larger than V1, inductor L2 discharges from its peak current value to zero faster than inductor L1 charges from zero to the peak value.

Capacitor C1 is not necessary in an ideal circuit where there is no inductance in the connection conductor 66. However, in a real circuit, charger 80 may be many feet away from batteries 58. This results in a large inductance for conductor 66. This inductance could cause large voltage spikes at point 2 shown in FIG. 12. To eliminate these spikes, capacitor C1 is added. This capacitance must be large enough to swamp out the inductance of conductor 66. The ripple current specification of this capacitor must be chosen to be one half of the maximum average battery current.

With chargers 50,70 (the boost circuits), the average currents through V1 and V2 behaved depending on the location of feedback signals FB2 as shown in FIGS. 7 and 9, respectively. That is, when signal FB2 measured the average output current, the feedback signal resulted in the output current being constant and independent of input voltage changes. When signal FB2 measured the average input current, the feedback signal resulted in the input current being constant and independent of input voltage changes. In charger 80 shown in FIG. 12, signal FB2 is measuring the average input current, and thus the circuit is used to charge batteries 58 while drawing constant current from the energy source (PV array 56). This is the preferred method of extracting energy from the energy source to eliminate the above-described problem of the photo voltaic array clamping at minimum voltage and maximum current.

FIGS. 14 and 15 show chargers 90,100 having push-pull topologies with the two different connections for feedback signal FB2. In FIG. 14, feedback signal FB2 on conductor 92 is the average charging current, and thus this circuit maintains constant average charging current. In FIG. 15, feedback signal FB2 on conductor 102 is the average input current from energy source PV array 56 (V1), and thus this circuit maintains constant input current. The feedback signals in each of chargers 90 and 100 make these circuits behave the same as the boost circuit charger 50 shown in FIG. 7 and the boost circuit charger 70 shown in FIG. 9. However, chargers 90 and 100 are better suited to higher voltage applications. The waveforms for the chargers shown in FIGS. 14 and 15 are shown in FIGS. 23a–23f.

The push-pull topology is different from the boost and flyback topologies in that when either of the switches S1,S2 are closed, energy is delivered to the battery 58 (V2). For the boost (FIGS. 7 and 9) and the flyback (FIG. 12) topologies, when switch S1 was closed, energy was stored in inductor L1 or transformer core T1. When switch S1 is opened, the stored energy was delivered to the battery (V2) as charging current. For all of the push-pull topologies discussed (FIGS. 14 through 17), energy is delivered to the battery 58 (V2) while switches S1,S2 are closed. The push-pull topologies use two gate signals (Vg1 and Vg2) on conductors 96,98 to provide equal alternating pulses to the switches. Switches S1 and S2 are never closed (on) at the same time. The pulses are of equal pulse-width and 180 degrees out of phase. These waveforms are shown as waveforms 5A and 5B in FIGS. 23b and 23c. When gate signal Vg1 is high, current flows through switch S1 and when gate signal Vg2 is high, current flows through switch S2. When either switch S1 or S2 is closed (on), current is drawn from the energy source, PV array 56 (V1), see waveform 1 in FIG. 23a), current flows through either switch S1 or S2 (waveforms 6A and 6B shown in FIG. 23d) and current flows through inductor L1 (waveform 3, shown in FIG. 23f) into batteries 58 (V2). Waveform 1 (see FIG. 23a) is the instantaneous current drawn from the energy source, PV array 56 (V1), waveform 2 (see FIG. 23a) is the time average of waveform 1 or the average current drawn from the energy source (V1), waveform 3 is the instantaneous charging current and also the current through inductor L1, and waveform 4 (see FIG. 23f) is the time average of waveform 3 or the average charging current.

In this example, V1 is 140 V and V2 is 200 V. When either switch S1 or S2 is closed, the primary voltage is approximately equal to V1. Since the center tap 94 of the secondary of transformer T1 is grounded, the secondary is directly across battery 58 (V2). In order to turn on diode D1 or diode D2 and provide charging current to the battery, the voltage produced by the secondary must be greater than V2. Since V1 is less than V2, the turns ratio of the secondary to the primary winding must be greater than 1. The waveforms shown in FIGS. 23a–23f are for a secondary to primary turns ratio of 2 and V1=140 V and V2=200 V. Waveform 1 shows that the primary current is from 0 to 30 A at a primary voltage 140 V. Waveform 7 (see FIG. 23e) is the waveform at point 5 in FIGS. 14 and 15. We see that this voltage varies between 0 and 280 V, resulting from a turns ratio of 2. The secondary current is shown as waveform 3 in FIG. 23f, which is in the range of 0 to 15 A. Thus, the secondary voltage is twice the primary voltage, and the secondary current is one-half of the primary current, which results from a transformer with a 2:1 turns ratio.

Inductor L1 and capacitor C1 of chargers 90,100 shown in FIGS. 14 and 15 is a buck regulator operating in the continuous mode. Inductor L1 is the only element that limits the charging current when either of switches (S1 and S2) are closed (on). If inductor L1 were not in the circuit, then when the switches were closed it would be like connecting V1 directly to V2 through a transformer. A large and uncontrolled current would flow. The inductor limits the charging current. Inductor L1 and capacitor C1 together remove the ripple so that battery 58 (batteries) are charged with an average current. The inductor is represented by waveform 3 shown in FIG. 23f. Inductor L1 and capacitor C1 remove the ripple so that the charging current is represented by waveform 4 shown in FIG. 23f.

Chargers 110,120 shown in FIGS. 16 and 17 are similar to chargers 90,100 shown in FIGS. 14 and 15 except that center tap (112,122) connection of transformer T1 is connected to PV array 56 (V1) and center tap 94 is connected to ground in chargers 90,100. The feedback method of all of the push-pull topologies is the same as the boost and flyback circuits. When feedback signal FB2 on conductor 114 measures the average output current, the feedback signal makes the output current constant and independent of input voltage changes. When feedback signal FB2 on conductor 124 measures the average input current, the feedback signal makes the input current constant and independent of input voltage changes. In FIGS. 7, 14, and 16, feedback signal FB2 is measuring the average charging current, and chargers 70, 90 and 110 shown in FIGS. 7, 14, and 16, respectively, are used to charge the battery 58 (V2) with a constant current, independent of voltage changes in PV array 56 (V1). In FIGS. 9, 12, 15, and 17, feedback signal FB2 is measuring the average input current, and chargers 70, 80, 100 and 120 shown in FIGS. 9, 12, 15, and 17, respectively, are used to charge battery 58 (V2) while drawing constant current from PV array 56, the energy source (V1).

The different placement of the center taps (112,122) in chargers 110,120 shown in FIGS. 16 and 17 when compared to the center taps 94 in chargers 90,100 shown in FIGS. 14 and 15 leads to an advantage in the size of the transformer. In chargers 90,100, the center tap of the secondary is grounded, and the battery voltage (V2) appears directly across the primary. This means that transformer T2 must supply all of the charging power. For a 2 kW charger, transformer T1 of chargers 90,100 must be designed to pass 2 kW of power and must have a turns ratio greater than 1. In chargers 100,120, the center tap of the secondary is connected to PV array 56 (V1). When switch S1 or S2 is on, the battery voltage appears across the secondary of transformer T1 plus battery voltage V1. In order to charge the batteries, diode D1 or diode D2 must be on. For chargers 90,100, the secondary voltage has to be greater than the battery voltage (V2). In chargers 110,120, center tap 112, 122, respectively, is connected to PV array 56 (V1). In order to turn on diode D1 or D2, it must be true that the PV array voltage (V1) plus the secondary voltage must be greater than the battery voltage (V2). Thus, the voltage provided by transformer T1 need only be large enough to overcome the voltage difference between the PV array voltage (V1) and the battery voltage (V2).

Since transformer T1 shown in FIGS. 16 and 17 only provides enough voltage to overcome the difference between the PV array voltage (V1) and the battery voltage (V2), the transformer handles significantly less power that the transformer needed for the chargers shown in FIGS. 14 and 15. As an example, suppose that the PV array voltage (V1) is 150 V and the battery voltage (V2) is 200 V and we want to charge the battery with a 10 A charging current. Also suppose that the chargers are designed to provide voltage pulses at point 5 in the circuits shown in FIGS. 14 through 17 of up to 250 V. For chargers 90,100 shown in FIGS. 14 and 15, the turns ratio of transformer T1 must be designed such that for a primary voltage of 150 V, the secondary voltage is 250 V. Since the instantaneous voltage produced by the secondary is 250 V, it must supply a charging current of 10 A, and the instantaneous power produced by the secondary is 250V times 10 A or 2.5 kW. For transformers T1 of chargers 110,120 shown in FIGS. 16 and 17, the secondary voltage plus V1 must be equal to 250 V. Or, the secondary must be designed to produce pulses of 250 V−V1=100 V. Since the instantaneous voltage produced by the secondary is 100 V, it must supply the charging current of 10 A, and the instantaneous power produced by the secondary is 100 V times 10 A or 1 kW. The advantage of the chargers shown in FIGS. 16 and 17 is that the power rating of transformer T1 is significantly smaller than the transformer needed for the chargers shown in FIGS. 14 and 15. In the above example, the transformer needed for chargers 110,120 was 40% of the size needed for chargers 90,100. In a typical design to accommodate a wide range of voltages, the transformer typically is 50% smaller.

Figure 23F:
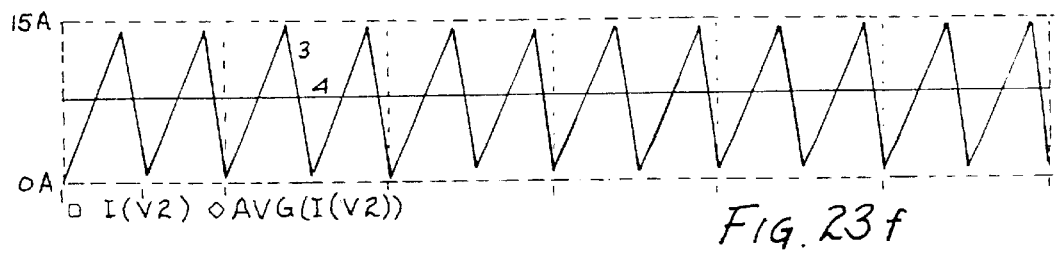
FIGS. 23$a$–23$f$ illustrate waveforms attendant the chargers shown in FIGS. 14 and 15.
Figure 23E:
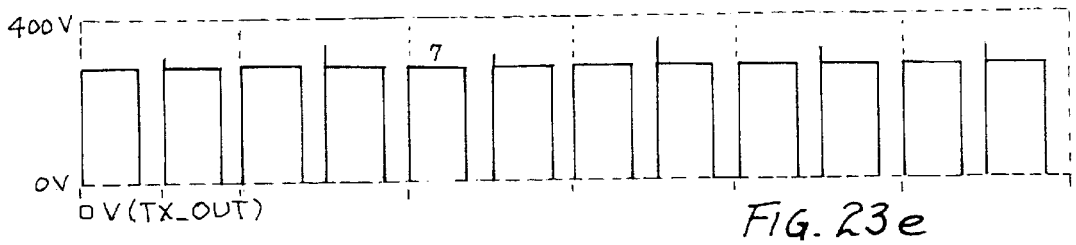
Figure 23D:
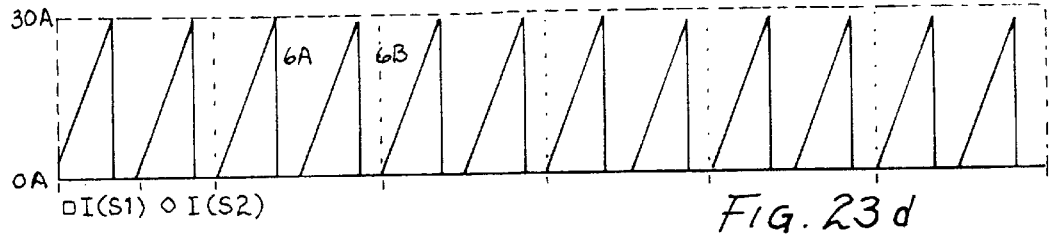
Figure 23C:
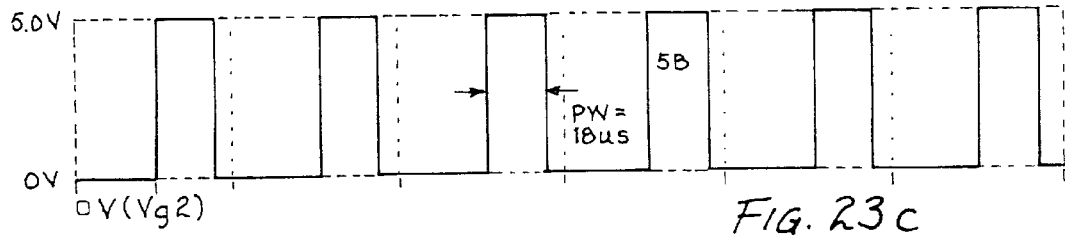
Figure 23B:
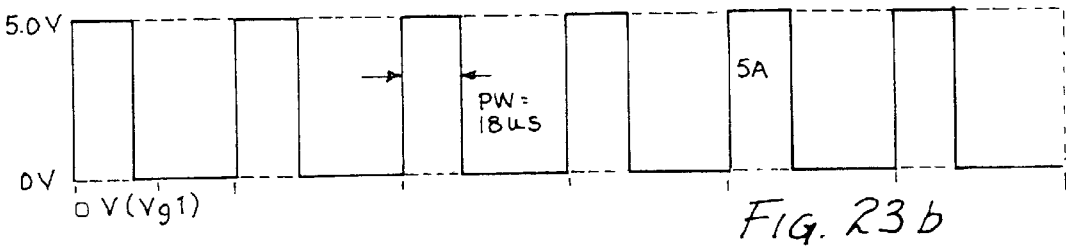

Typical waveforms for the circuits of chargers 110,120 are shown in FIGS. 24a–24f. These waveforms were generated for an input voltage V1=140 V, an output voltage V2=200 V, and a turns ratio of 1:1 for transformer T1. When compared to the waveforms shown in FIGS. 23a–23f, there are two primary differences. In FIG. 23e, waveform 7 goes from 0 to 280 V. This is because of use of a 2:1 transformer T1 with center tap 94 grounded (charger 90,100). Waveform 7 in FIG. 24e goes from 140 to 280 V because of use of a 1:1 transformer T1 with center tap (112,122 for chargers 110, 120) connected to the input voltage (V1) of PV array 56.

Figure 23A:
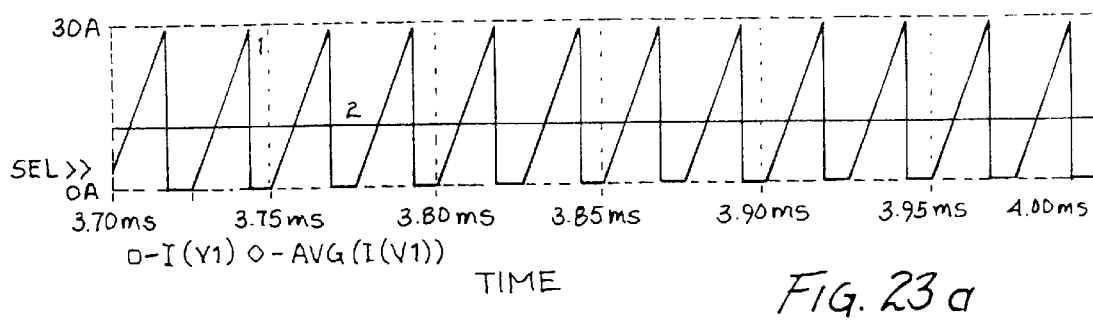
Figure 24F:
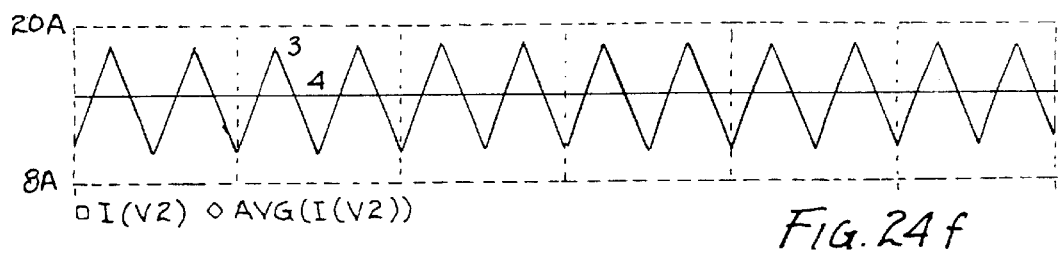
FIGS. 24$a$–24$f$ illustrate waveforms attendant the chargers shown in FIGS. 16 and 17.
Figure 24E:
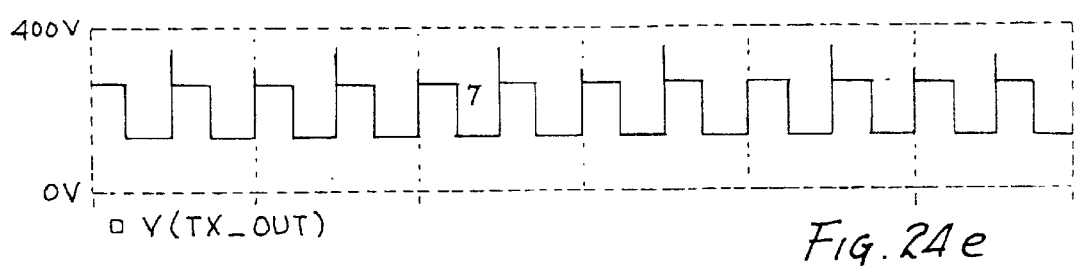
Figure 24D:
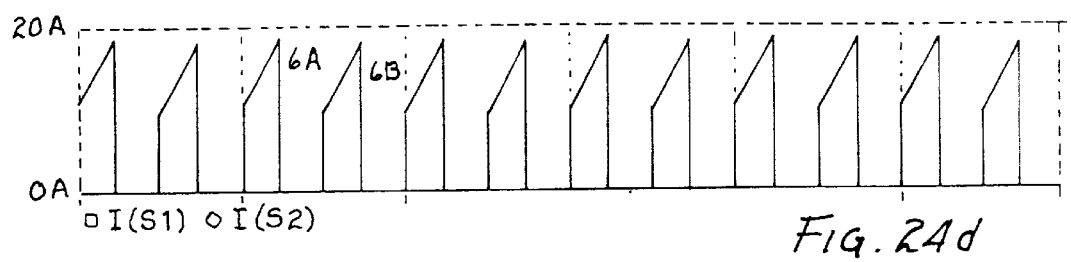
Figure 24C:
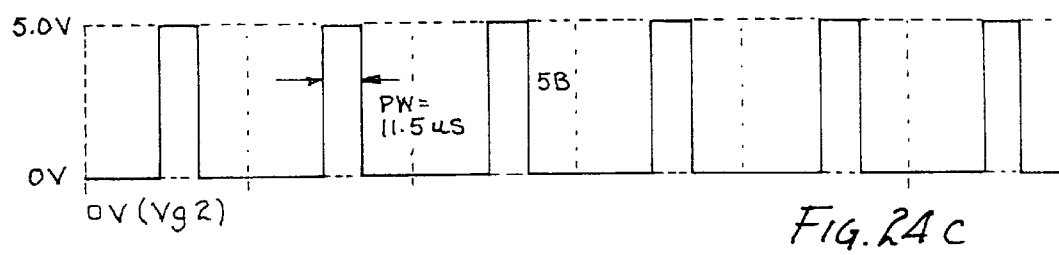
Figure 24B:
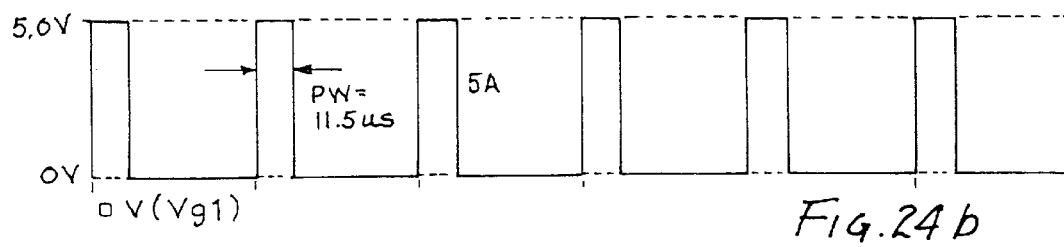
Figure 24A:
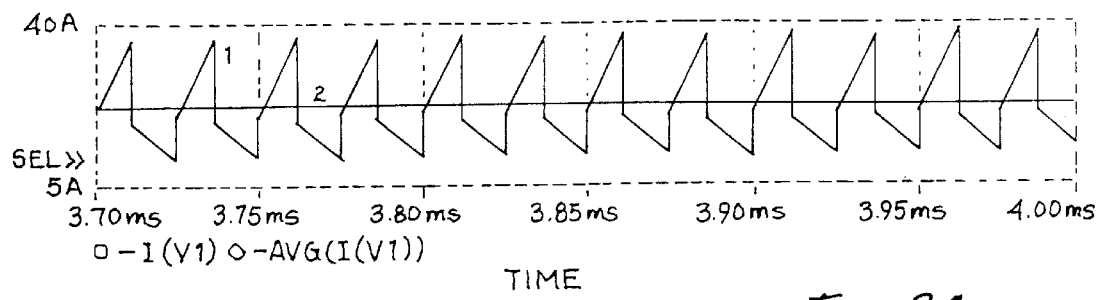

Waveform 1 is also different in FIGS. 23a and 24a. In FIG. 23a, waveform 1 goes to zero because the current drawn from the input voltage V1 (PV array 56) goes to zero when switches S1 and S2 are off. This results because when switches S1 and S2 are off, there is no current through the transformer T1 and no current can be drawn from the PV array (V1). In FIG. 24a, waveform 1 never goes to zero. This results because the PV array (V1) supplies both the transformer current and the current through inductor L1. When switches S1 and S2 are off there is no current through transformer T1. However, the PV array (V1) must also supply current to the inductor. The buck regulator represented by inductor L1 and capacitor C1 operates in the continuous mode, so the current through inductor L1 never goes to zero. Since the current through the inductor never goes through zero, and as the PV array (V1) supplies the current for inductor L1 when switches S1 and S2 are off, the current supplied by the PV array (V1) never goes to zero.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A method for charging a battery from an electrical energy source, comprising the steps of:
   (a) tracing out substantially an entire I–V characteristic of the energy source to determine a voltage and current level that yield the maximum power which can be drawn from the energy source; and
   (b) drawing the current level from the energy source that yields the maximum power to charge the battery.

2. The method as set forth in claim 1 wherein the energy source is a variable energy source.

3. The method as set forth in claim 2 wherein the energy source includes a photo voltaic panel.

4. The method as set forth in claim 1 wherein the step of tracing out the entire I–V characteristic of the energy source is performed periodically.

5. The method as set forth in claim 1 comprising the additional steps of:
   (a) sensing for changes in the voltage level of the energy source during the step of drawing the current level from the energy source;
   (b) tracing out a portion of the I–V characteristic of the energy source in response to sensing of a change in the voltage level of the energy source to determine a new voltage and current level that yield the maximum power which can be drawn from the energy source; and
   (c) drawing the new current level from the energy source that yields the maximum power to charge the battery.

6. The method as set forth in claim 5 wherein the step of tracing out a portion of the I–V characteristic of the energy source in response to sensing of a change in the voltage level of the energy source includes the steps of:
   (a) if the voltage level of the energy source is sensed to have increased, tracing out a portion of the I–V characteristic for increasing current levels starting at the current level being drawn from the energy source to charge the battery and ending when the energy source voltage goes below a preset minimum operating voltage; and
   (b) if the voltage level of the energy source is sensed to have decreased, tracing out a portion of the I–V characteristic for decreasing current levels starting at the current level being drawn from the energy source to charge the battery and ending when the power produced by the energy source falls below a specified percent of the maximum power observed during the sweep.

7. A battery charger for charging a battery from an electrical energy source, comprising:
   (a) means for tracing out substantially en entire I–V characteristic of the energy source to determine a voltage and current level that yield the maximum power which can be drawn from the energy source; and (b) means for drawing the current level from the energy source that yields the maximum power to charge the battery.

8. The battery charger as set forth in claim 7 wherein the energy source is a variable energy source.

9. The battery charger as set forth in claim 8 wherein the energy source includes a photo voltaic panel.

10. The battery charger as set forth in claim 7 wherein the means for tracing out the entire I–V characteristic of the energy source includes means for tracing out the entire I–V characteristic of the energy source periodically.

11. The battery charger as set forth in claim 7 comprising additionally:

(a) means for sensing for changes in the voltage level of the energy source while drawing the current level from the energy source;

(b) means for tracing out a portion of the I–V characteristic of the energy source in response to sensing of a change in the voltage level of the energy source to determine a new voltage and current level that yield the maximum power which can be drawn from the energy source; and (c) means for drawing the new current level from the energy source that yields the maximum power to charge the battery.

12. The battery charger as set forth in claim 11 wherein the means for tracing out a portion of the I–V characteristic of the energy source in response to sensing of a change in the voltage level of the energy source includes:

(a) means for determining if the voltage level of the energy source is sensed to have increased and for tracing out a portion of the I–V characteristic for increasing current levels starting at the current level being drawn from the energy source to charge the battery and ending when the energy source voltage goes below a preset minimum operating voltage; and (b) means for determining if the voltage level of the energy source is sensed to have decreased and for tracing out a portion of the I–V characteristic for decreasing current levels starting at the current level being drawn from the energy source to charge the battery and ending when the power produced by the energy source falls below a specified percent of the maximum power observed during the sweep.

13. A method for charging a battery with a current mode feedback from an energy source providing electrical power, said method comprising the steps of:

(a) providing a first feedback signal commensurate with the instantaneous switch current of a switch having a controllable duty cycle;

(b) further providing a second feedback signal commensurate with the average current flowing to the battery; and (c) generating a gate signal with a control circuit responsive to the first and second feedback signals, the voltage at the energy source and the voltage at the battery to control the duty cycle of the switch and maximize the power level delivered by the energy source to the battery.

14. The method as set forth in claim 13 including the step of passing the current generated by the energy source through an inductor to the switch.

15. The method as set forth in claim 13 including the step of producing the energy source from a plurality of photo voltaic panels.

16. The method as set forth in claim 13 including the step of producing the energy source from a photo voltaic array.

17. A method for charging a battery with constant current from an energy source providing electrical power, said method comprising the steps of:

(a) providing a first feedback signal commensurate with the instantaneous switch current of a switch having a controllable duty cycle;

(b) further providing a second feedback signal commensurate with the current drawn from the energy source; and (c) generating a gate signal with a control circuit responsive to the first and second feedback signals, the voltage at the energy source, and the voltage at the battery to control the duty cycle of the switch and maximize the power level delivered by the energy source.

18. The method as set forth in claim 17 including the step of passing the current generated by the energy source through an inductor to the switch.

19. The method as set forth in claim 17 including the step of producing the energy source from a plurality of photo voltaic panels.

20. The method as set forth in claim 17 including the step of producing the energy source from a photo voltaic array.

21. A method for charging a battery from an energy source which energy source may have a voltage lower than the battery voltage, said method comprising the steps of:

(a) providing a first feedback signal commensurate with the instantaneous switch current of a switch having a controllable duty cycle;

(b) further providing a second feedback signal commensurate with the current drawn from the energy source drawn through a transformer having a primary coil in series with the energy source and the switch and a secondary coil in series with the battery; and (c) generating a gate signal with a control circuit responsive to the first and second feedback signals, the voltage at the energy source and the voltage at the battery to control the duty cycle of the switch.

22. The method as set forth in claim 21 wherein said step of further providing includes the step of developing the second feedback signal with a current monitor.

23. The method as set forth in claim 21 including the step of producing the energy source from a photo voltaic array having a voltage less than the voltage of the battery.

24. The method as set forth in claim 21 including the step of producing the energy source from a plurality of photo voltaic panels connected in series and wherein the battery includes a plurality of batteries connected in series.

25. A method for charging a battery from an energy source which may have a voltage lower than the battery, said method comprising the steps of:

(a) connecting the energy source across the center tap of the primary coil of a transformer and ground;

(b) interconnecting one end of the primary coil with a first switch through a resistor to ground;

(c) further interconnecting another end of the primary coil with a second switch through the resistor to ground;

(d) further connecting the battery across the center tap of the secondary coil of the transformer and the opposed ends of the secondary coil through diodes;

(e) providing a first feedback signal commensurate with the instantaneous switch current;

(f) further providing a second feedback signal commensurate with the current flowing to the battery; and (g) generating first and second gate signals with a control circuit responsive to the first and second feedback signals, the voltage at the energy source and the voltage at the battery to control the duty cycles of the first and second switches, respectively, and maximize the power level delivered by the energy source to the battery.

26. The method as set forth in claim 25 including the step of producing the energy source from a photo voltaic array having a voltage less than the voltage of the battery.

27. The method as set forth in claim 26 including the step of producing the energy source from a plurality of photo voltaic panels connected in series and wherein the battery includes a plurality of batteries connected in series.

28. The method as set forth in claim 25 wherein said step of further providing includes the step of developing the second feedback signal with a current monitor.

29. A method for charging a battery from an energy source which may have a voltage lower than the battery, said method comprising the steps of:
(a) connecting the energy source across the center tap of a primary coil of a transformer and ground;
(b) interconnecting one end of the primary coil with a first switch through a resistor to ground;
(c) further interconnecting another end of the primary coil with a second switch through the resistor to ground;
(d) further connecting the battery across the center tap of a secondary coil of the transformer and the opposed ends of the secondary coil through diodes;
(e) providing a first feedback signal commensurate with the instantaneous switch current;
(f) further providing a second feedback signal commensurate with the current flowing from the energy source; and
(g) generating first and second gate signals with a control circuit responsive to the first and second feedback signals, the voltage at the energy source and the voltage at the battery to control the duty cycle of the first and second switches, respectively, and maximize the power level delivered by the energy source to the battery.

30. The method as set forth in claim 29 including the step of producing the energy source with a photo voltaic array having a voltage less than the voltage of the battery.

31. The method as set forth in claim 29 wherein said step of further providing comprises the step of developing the second feedback signal with a current monitor.

32. A method for charging a battery from an energy source which may have a voltage lower than the battery, said method comprising the steps of:
(a) connecting the energy source across a center tap of a primary coil of a transformer and a ground common to the energy source and the battery;
(b) interconnecting one end of the primary coil with a first switch through a resistor to ground;
(c) further interconnecting another end of the primary coil with a second switch through the resistor to ground;
(d) connecting the battery to opposed ends of a secondary coil of the transformer through diodes and to the ground common with the energy source;
(e) providing a first feedback signal commensurate with the instantaneous switch current;
(f) further providing a second feedback signal commensurate with the current flowing to the battery; and
(g) generating first and second gate signals with a control circuit responsive to said first and second feedback signals, the voltage at the energy source and the voltage at the battery to control the duty cycles of the first and second switches, respectively, and maximize the power level delivered by the energy source to the battery.

33. The method as set forth in claim 32 including the step of producing the energy source with a photo voltaic array having a voltage less than the voltage of the battery.

34. The method as set forth in claim 32 wherein said step of further providing comprises the step of developing the second feedback signal with a current monitor.

35. A method for charging a battery from an energy source which may have a voltage lower than the battery, said method comprising the steps of:
(a) connecting the energy source across a center tap of a primary coil of a transformer and a ground common to the energy source and the battery;
(b) interconnecting one end of the primary coil with a first switch through a resistor to ground;
(c) further interconnecting another end of the primary coil with a second switch through the resistor to ground;
(d) further connecting the battery to opposed ends of a secondary coil of the transformer through diodes and to the ground common with the energy source;
(e) providing a first feedback signal commensurate with the instantaneous switch current;
(f) further providing a second feedback signal commensurate with the current flowing from the energy source; and
(g) generating first and second gate signals with a control circuit responsive to said first and second feedback signals, the voltage at the energy source and the voltage at the battery to control the duty cycles of the first and second switches, respectively, and maximize the power level delivered by the energy source to the battery.

36. The method as set forth in claim 35 including the step of producing the energy source with a photo voltaic array having a voltage less than the voltage of the battery.

37. The method as set forth in claim 36 wherein said step of further providing comprises a step of developing the second feedback signal with a current monitor.

* * * * *